United States Patent
Solomon et al.

(10) Patent No.: US 7,413,317 B2
(45) Date of Patent: Aug. 19, 2008

(54) POLARIZED UV EXPOSURE SYSTEM

(75) Inventors: Jeffrey L. Solomon, Vadnais Heights, MN (US); Michael C. Lea, Bracknell (GB); Richard C. Allen, Lilydale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 444 days.

(21) Appl. No.: 10/858,998

(22) Filed: Jun. 2, 2004

(65) Prior Publication Data

US 2005/0270617 A1 Dec. 8, 2005

(51) Int. Cl.
*F21V 9/14* (2006.01)

(52) U.S. Cl. .................... 362/19; 362/293; 313/112; 359/483; 359/487; 359/495; 359/497; 359/499

(58) Field of Classification Search .................. 349/125, 349/127, 129, 130, 132, 134, 135; 362/19, 362/293, 317, 319; 359/485, 487, 858, 483, 359/495, 497, 499

See application file for complete search history.

(56) References Cited

U.S. PATENT DOCUMENTS

| 4,974,941 | A | | 12/1990 | Gibbons et al. |
|---|---|---|---|---|
| 5,032,009 | A | | 7/1991 | Gibbons et al. |
| 5,073,294 | A | | 12/1991 | Shannon et al. |
| 5,383,053 | A | * | 1/1995 | Hegg et al. ............... 359/486 |
| 5,731,405 | A | | 3/1998 | Gibbons et al. |
| 5,889,571 | A | | 3/1999 | Kim et al. |
| 5,934,780 | A | * | 8/1999 | Tanaka ..................... 362/19 |
| 6,061,138 | A | | 5/2000 | Gibbons et al. |
| 6,122,103 | A | * | 9/2000 | Perkins et al. ............. 359/486 |
| 6,190,016 | B1 | * | 2/2001 | Suzuki et al. ................ 362/19 |
| 6,206,527 | B1 | * | 3/2001 | Suzuki ..................... 359/858 |
| 6,234,634 | B1 | * | 5/2001 | Hansen et al. ............... 353/20 |
| 6,307,609 | B1 | | 10/2001 | Gibbons et al. |
| 6,407,789 | B1 | | 6/2002 | Gibbons et al. |
| 6,486,997 | B1 | | 11/2002 | Bruzzone et al. |
| 6,791,749 | B2 | * | 9/2004 | DelPico et al. ............. 359/487 |
| 6,899,440 | B2 | * | 5/2005 | Bierhuizen ................. 362/19 |
| 2002/0044236 | A1 | | 4/2002 | Suzuki et al. |
| 2003/0043461 | A1 | | 3/2003 | Delpico et al. |
| 2003/0206337 | A1 | * | 11/2003 | Liang et al. ................ 359/352 |
| 2004/0008310 | A1 | | 1/2004 | Leidig et al. |
| 2004/0196644 | A1 | * | 10/2004 | Kim et al. ..................... 362/19 |

FOREIGN PATENT DOCUMENTS

| EP | 1172684 A | 1/2002 |
|---|---|---|
| WO | WO 99/08148 | 2/1999 |
| WO | WO 01/53744 A | 7/2001 |

* cited by examiner

*Primary Examiner*—Jacob Y Choi
(74) *Attorney, Agent, or Firm*—Jay R. Pralle

(57) ABSTRACT

A light exposure system is used to expose an alignment layer formed of anisotropically absorbing molecules so as to allow alignment of subsequently applied liquid crystal polymer (LCP) molecules. The light incident on the alignment layer is polarized. When a single polarizer is used, the azimuthal polarization direction varies across the substrate carrying the alignment layer. Various approaches to reducing the azimuthal polarization variation may be adopted, including the introduction of various types of polarization rotation reduction element and in selecting an appropriate tilt angle for the light source. Furthermore, a reflective structure may be inserted between the light source and the alignment layer. Use of the reflective structure increases the total amount of light incident on the alignment layer.

7 Claims, 25 Drawing Sheets

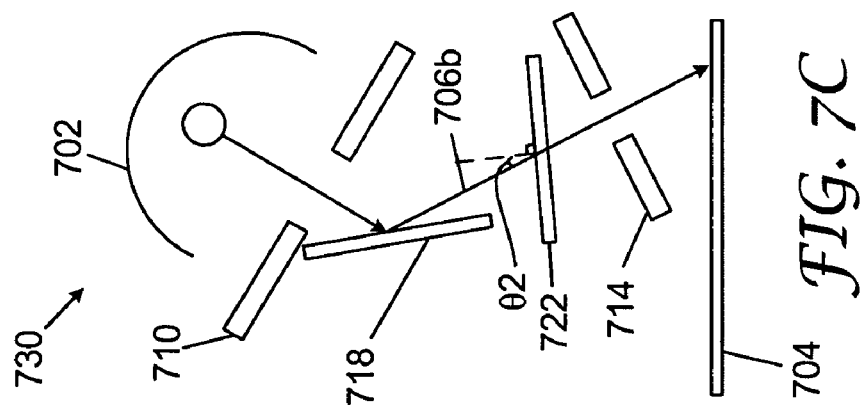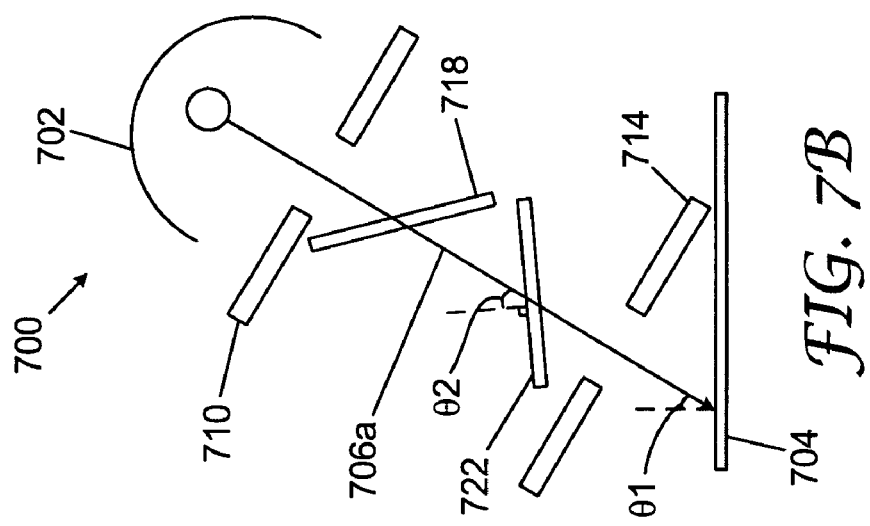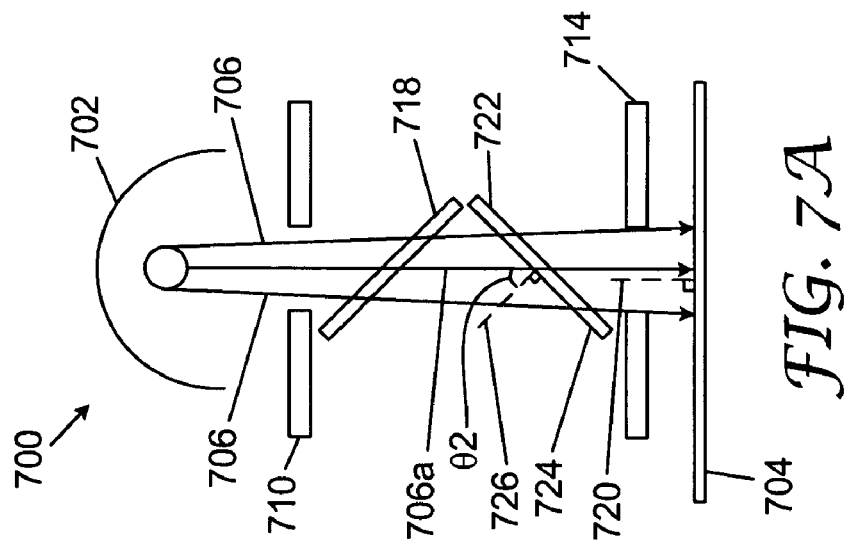

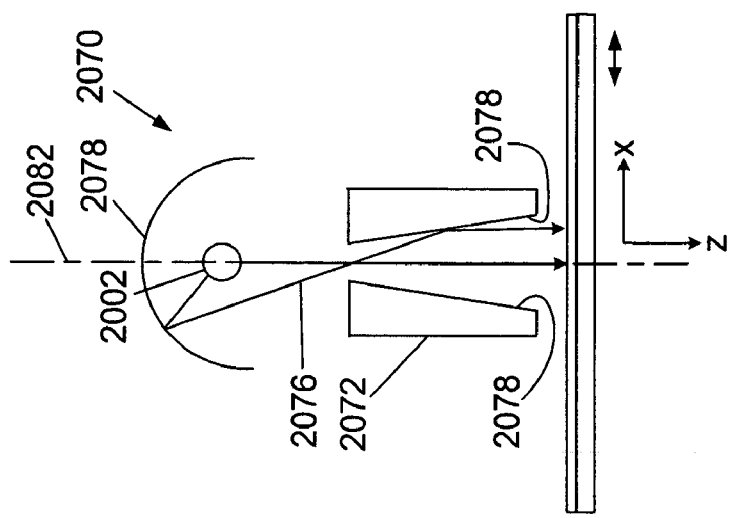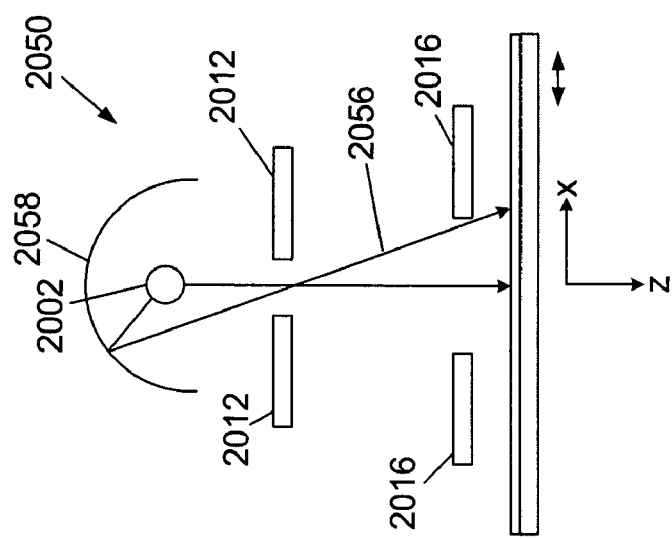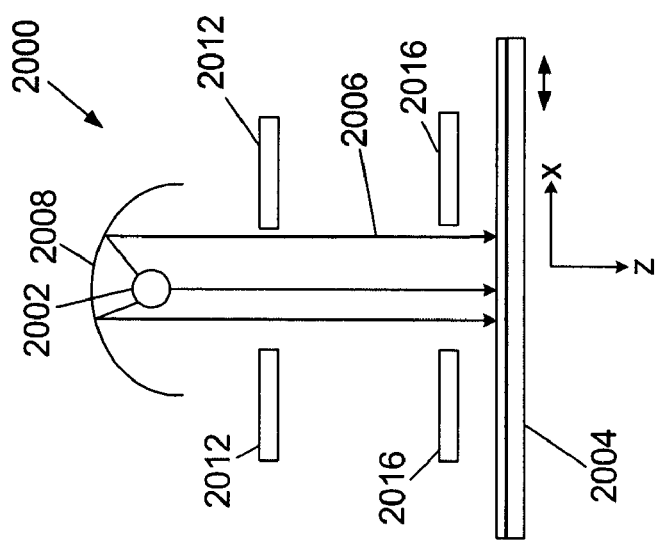

POLARIZED UV EXPOSURE SYSTEM

FIELD OF THE INVENTION

The invention relates to optical exposure systems, and more particularly to systems for optically exposing large areas with polarized light.

BACKGROUND

The present invention relates to optical exposure systems and optical process for aligning optical alignment layers and liquid crystals with light.

Liquid crystal displays (LCDs) find application in many areas of information display, including instrument controls, watches, portable computers, desk top computer monitors, LCD televisions and LCD projectors. Most LCD devices employ an LCD panel that has a layer of liquid crystal material disposed between a pair of substrates. The inner surface of at least one of the substrates is an alignment surface for aligning the liquid crystal molecules in the absence of an applied electric field. Commonly, the alignment surface is a polymeric alignment layer. In some displays, the direction of alignment of the alignment layer is established in a mechanical buffing process wherein the polymer layer is buffed with a cloth or other fibrous material. The liquid crystal medium contacting the buffed surface typically aligns parallel to the mechanical buffing direction.

Alternatively, an alignment layer comprising anisotropically absorbing molecules can be exposed to polarized UV light. Such exposure aligns the molecules of the alignment layer which can then be used to align a liquid crystal medium. This type of alignment layer is referred to herein as an exposed alignment layer.

In many LCDs, the alignment layer not only aligns the liquid crystal (LC) molecules, but also imparts a pre-tilt to the molecules. The LC molecules that contact an alignment layer with pre-tilt are aligned in a direction parallel to a particular direction, for example the buffing direction when using a buffed alignment layer, but the LC molecules need not be aligned parallel to the substrate. For example, the LC molecules may be tilted from the plane of the substrate by a few degrees. Many types of LCD require that the alignment layer include a pre-tilt for optimum performance. An exposed alignment layer can be given a pre-tilt by altering the angle of incidence of the UV light when exposing the alignment layer.

SUMMARY OF THE INVENTION

In view of the above discussion, there is a need for an efficient exposure system for exposing alignment layers. The exposure system should deliver as much light polarized in the desired polarization state as possible. The exposure system should also be adaptable for illuminating the alignment layer at a non-normal angle of incidence so as to permit the exposure of alignment layers with pretilt.

One embodiment of the invention is directed to an optical exposure system for exposing an optical alignment layer at a target area. The system includes a light source elongated in a direction parallel to a first axis that illuminates the target area. A first polarizer is disposed to polarize at least a portion of the light passing from the light source to the target area. A polarization rotation compensation element is disposed to control azimuthal rotation of the polarization of light directed from the first polarizer to the target area.

Another embodiment of the invention is directed to a method of aligning an optical alignment layer. The method includes generating light in an illumination unit having an elongated light source and polarizing the light from the elongated light source using a first polarizer. The optical alignment layer is illuminated with the polarized light and azimuthal polarization rotation of the polarized light incident on the optical alignment layer is compensated.

Another embodiment of the invention is directed to an optical exposure system for exposing an optical alignment layer at a target area. The system includes an illumination unit comprising a light source elongated in a direction parallel to a first axis and a first polarizer disposed to polarize at least a portion of illumination light passing from the light source to the target area, an illumination axis of the illumination light being incident at the target area at a non-normal tilt angle, the non-normal tilt angle being selected so as to reduce azimuthal rotation of the polarization of light across the target area in a direction parallel to the first axis.

Another embodiment of the invention is directed to an optical exposure system for exposing an optical alignment layer at a target area. The system comprises a light source elongated in a direction parallel to a first axis and a first polarizer disposed to polarize at least a portion of the light passing from the light source to the target area. A polarization rotation compensation element is disposed beside the first polarizer so that at least some of the light from the light source that reaches the target, and that is not incident on the first polarizer, is incident on the polarization rotation compensation element. Light incident at the target area via the first polarizer has a first azimuthal polarization rotation profile across the target area and light incident at the target area via the polarization compensation element has a second azimuthal polarization rotation profile that at least partially compensates for the first azimuthal polarization rotation profile.

Another embodiment of the invention is directed to an optical exposure system for exposing an optical alignment layer at a target area. The system comprises a light source elongated in a direction parallel to a first axis. Light is emitted by the light source in a direction parallel to a second axis, the second axis being orthogonal to the first axis, and is incident at the target area. A first polarizer is disposed to polarize at least a portion of the light passing from the light source to the target area. A reflective assembly is disposed between the light source and the target area. The reflective assembly has at least one first reflective surface non-parallel to the second axis so that at least some light propagating from the light source to the target area in a direction non-parallel to the second axis is diverted by the at least one first reflective surface to be more parallel to the second axis than before being diverted by the at least one reflective surface.

Another embodiment of the invention is directed to a method of illuminating a target area. The method includes emitting light from a light source elongated in a direction parallel to a first axis. Light emitted by the light source in a direction parallel to a second axis, the second axis being orthogonal to the first axis, is incident at the target area. At least a portion of the light emitted from the light source towards the target area is polarized. Light emitted by the light source in a direction non-parallel to the second axis is reflectively diverted using at least one first reflective surface non-parallel to the first and second axes so that the diverted light propagates in a direction more parallel to the second axis than before being diverted by the at least one reflective surface.

The above summary of the present invention is not intended to describe each illustrated embodiment or every implementation of the present invention. The figures and the following detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 7A-7C schematically illustrate embodiments of a tilted UV exposure system according to principles of the present invention;

FIGS. 20A-20C schematically illustrates three different types of exposure systems, that use different methods for constraining the down-web divergence of the illumination light;

Figure 1A:
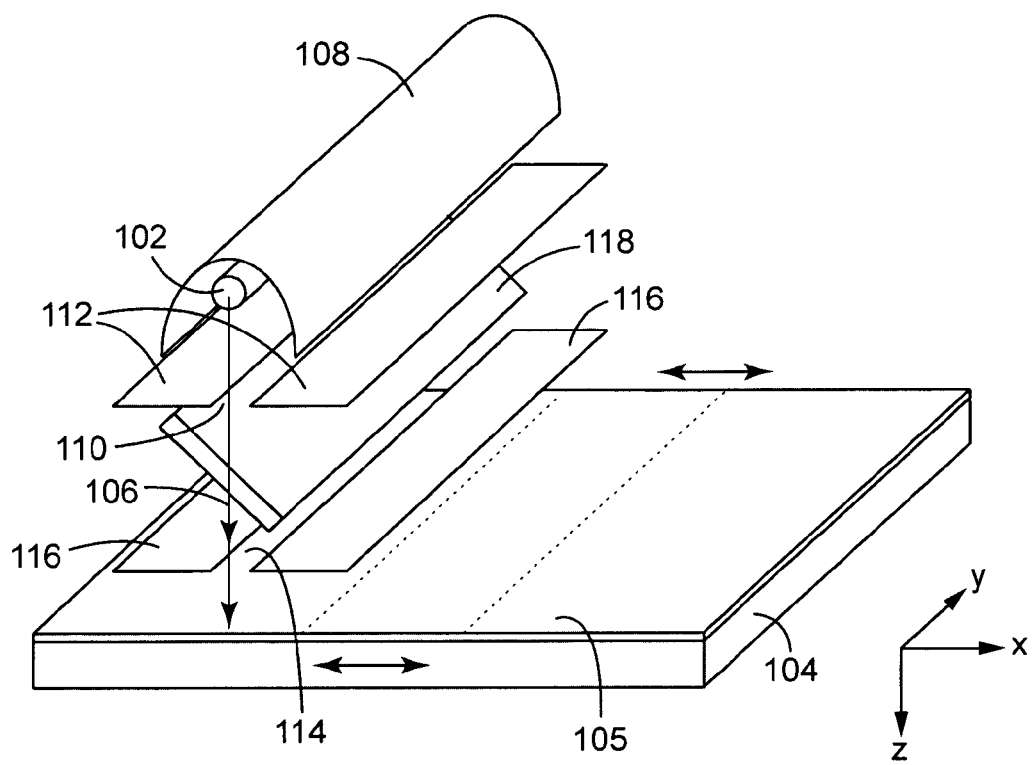
FIGS. 1A and 1B schematically illustrate an embodiment of a prior art polarized light exposure system for exposing alignment layers.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical exposure systems and is more particularly applicable to exposure systems that are used for forming alignment layer using a material that has an anisotropic response to exposure to polarized light. Such materials include anisotropically absorbing material and linearly photopolarizable polymers.

Figure 1B:
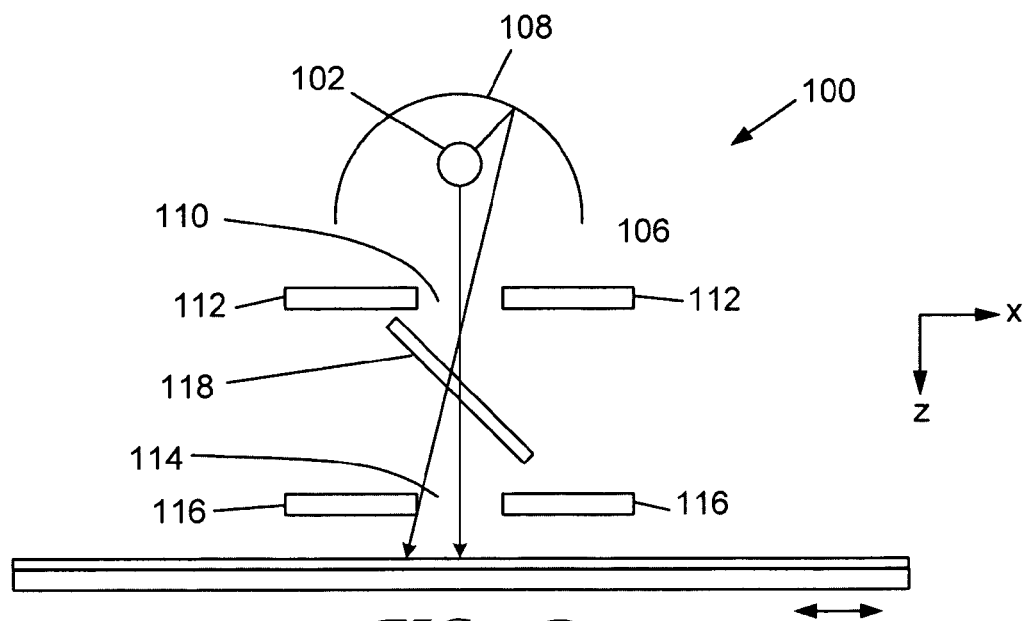

A schematic view of a conventional UV exposure system 100 is presented in FIG. 1A, with a corresponding side view being presented in FIG. 1B. A linear UV light source 102 is placed above a substrate 104. The substrate 104 comprises the polymer layer 105 that is to be exposed to the UV light.

A set of Cartesian co-ordinates may be defined to aide in describing the system 100. The plane of the substrate is defined as the x-y plane, with the normal to the substrate being parallel to the z-axis. The substrate 104 may be translated relative to the light source, for example in the x-direction. In some cases, the substrate 104 is a polymer web that is continuously fed in the x-direction. In such cases, the y-direction, parallel to the axis of the linear UV light source 102, is often referred to as the cross-web direction.

The light source 102 generates UV light 106, some of which is directly incident on the substrate 104. A reflector 108 is placed close to the UV light source 102 to reflect UV light towards the substrate 104, and thus increase the amount of UV light 106 incident on the substrate 104 from the UV light source 102. A first aperture 110 is formed between a first pair of vanes 112. A second aperture 114 is formed between a second pair of vanes 116. The two apertures 110 and 114 define the divergence angle of the light 106 in the x-z plane incident on the substrate 104. There is no aperture or vane present to restrict the divergence of the light 106 in the y-z plane, parallel to the axis of the linear UV source 102.

A polarizer 118 is disposed between the pairs of vanes 112 and 116 to polarize the light 106 incident on the substrate 104. The polarizer 118 relies on the Brewster effect to polarize the incident light. When p-polarized light is incident on one layer at Brewster's angle, the light is transmitted substantially without loss. When s-polarized light is incident on one layer at Brewster's angle, a substantial fraction of the s-polarized light is reflected, although there is also significant transmission. Passage of the light 106 through several layers of the polarizer 118 has little effect on the p-polarized light, but the intensity of the s-polarized light is significantly reduced, due to the additive effect of reflection at each layer of the polarizer 118. Hence, the polarizer 118 transmits a beam that is mostly p-polarized and reflects a beam that is mostly s-polarized. For the particular geometry illustrated in FIGS. 1A and 1B, and for light that is normally incident on the substrate 104 from the light source 102, p-polarized light is polarized parallel to the x-z plane and, in fact, is polarized with its electric vector in the x-direction. The s-polarized light reflected from the polarizer 118 is blocked from incidence on the substrate 104, so that only the p-polarized light reaches the substrate 104.

The system 100 need not operate with only the p-polarized light being used for exposing the substrate 104. In another embodiment, the s-polarized light reflected from the polarizer 118 may be incident on the substrate 104, while the p-polarized light is blocked. Also, the polarizer 118, or sections of the polarizer 118, may be rotated through 90° about the z-axis so that p-polarized light lies in the y-z plane.

Figure 2A:
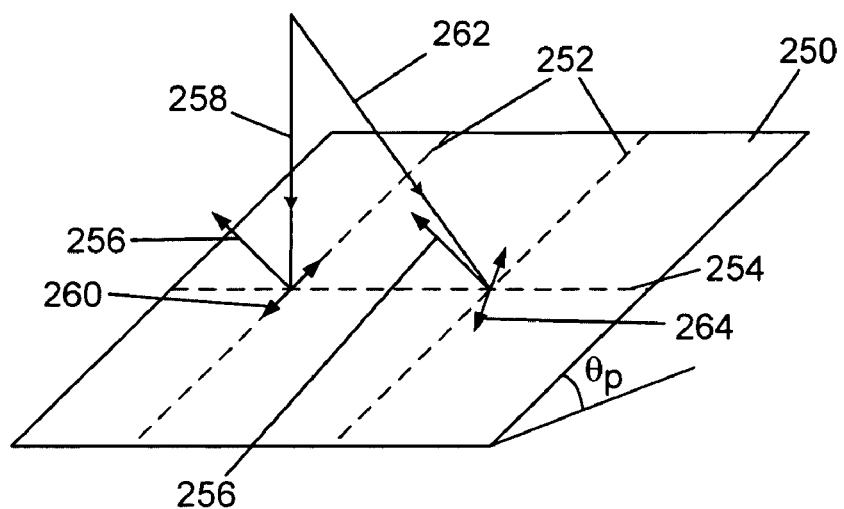
FIG. 2A schematically illustrates the azimuthal rotation of the polarization plane for light obliquely incident on a polarizer.

The polarization of the p-polarized UV light 106 incident on the substrate 104, however, is not uniform across the width of the substrate 104 when the system 100 is used. This is now described with reference to FIGS. 2A-C. First, consider the effect of oblique incidence on a MacNeille polarizer, as is schematically illustrated in FIG. 2A. The polarizer surface 250 is tilted at an angle $\theta_p$. Parallel dashed lines 252 are shown on the surface 250 for illustration purposes. Dashed line 254 on the surface 250 is perpendicular to lines 252. Lines 256 are normal to the surface 250. Light ray 258 is incident on the surface and is parallel to a plane containing the normal 256 and the line 252. Consequently, the plane of p-polarization 260, parallel to the plane of incidence, is parallel to the line 252. Oblique ray 262 is incident on the surface but does not lie parallel to a plane containing the normal 256 and the line 252. Consequently, the plane of p-polarization 264, parallel to the plane of incidence, does not lie parallel to the line 252. Thus, the plane of polarization for oblique rays is rotated in azimuth compared to rays whose plane of incidence lies normal to the surface of the polarizer.

Figure 2B:
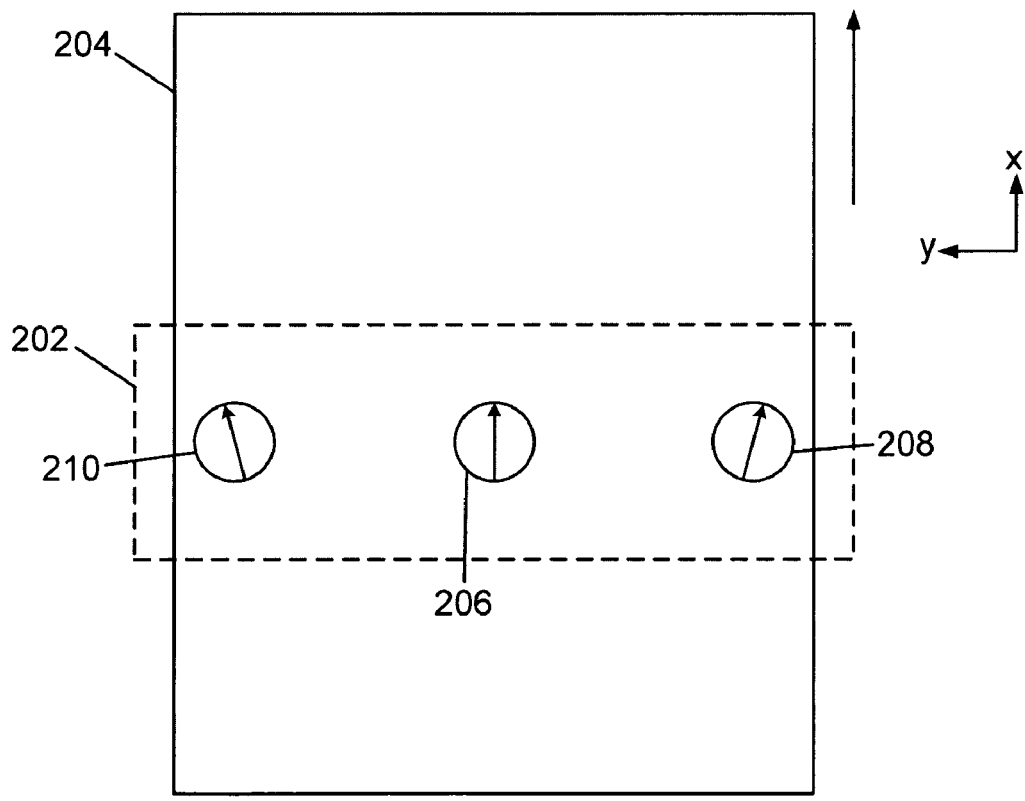
FIG. 2B schematically illustrates a plan view of the system illustrated in FIGS. 1A and 1B, showing polarization rotation at the edges of the exposed area.
Figure 2C:
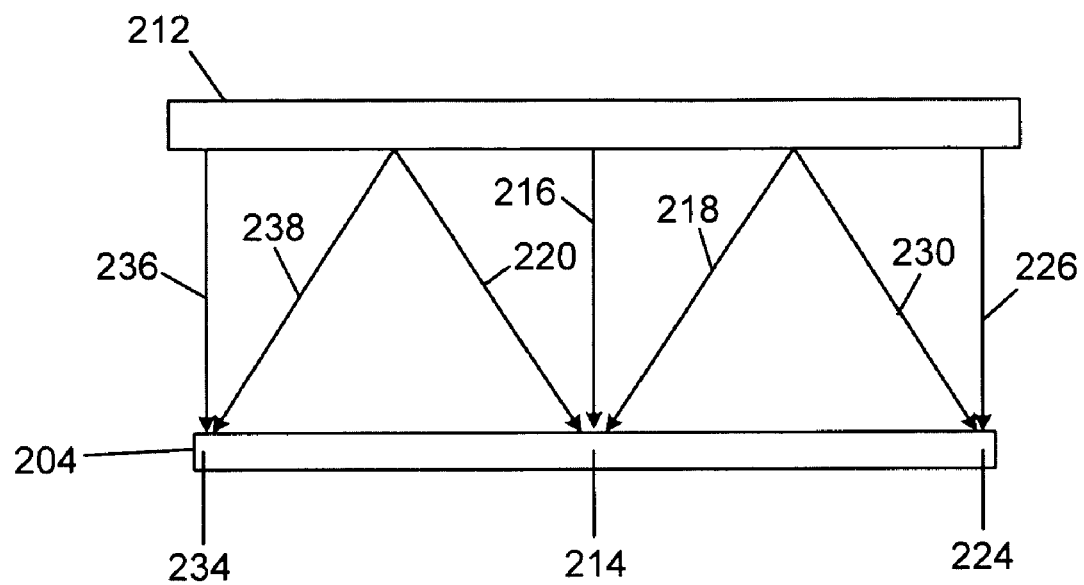
FIG. 2C schematically illustrates an end-on view of the system illustrated in FIGS. 1A and 1B, showing asymmetrical illumination of edges of the substrate.

Consider now FIG. 2B, in which the UV exposure system 202 is shown schematically lying across the substrate 204. It is found that the polarization of the light varies across the substrate 204. The polarization direction 206 of the light at the center of the substrate 204 is directed substantially parallel to the x-direction, as desired. At the edges of the substrate however, the direction of the polarization is rotated. For example, at the right hand edge of the substrate 204, the polarization direction 208 of the light is rotated clockwise relative to the center polarization 206. At the left hand edge of the substrate 204, the polarization direction 210 of the light is rotated counter-clockwise relative to the center polarization 206.

It is believed that the rotation of the polarization across the substrate occurs for the following reasons. First, it is important to note, with respect to FIG. 2B that any particular point across the substrate is not illuminated only with normally incident light, but is also illuminated with light that originates from parts of the light source 212 that is not directly above the point of the substrate. For example, the central point 214 of the substrate 204 is illuminated by normally incident light 216 and by obliquely incident 218 from the right side and obliquely incident light 220 from the left side. The edges of the substrate, however, are only obliquely illuminated by light from one side, however. For example, point 224 at the right side of the substrate 204 is illuminated by normally incident light 226 and obliquely incident light 230 originating from the left of point 224. Also, point 234 at the left side of the substrate 204 is illuminated by normally incident light 236 and obliquely incident light 238 originating from the right of point 234. This lack of symmetry in the illumination of the edges of the substrate 204, compared to the illumination of the center of the substrate 204, is believed to be the basis of the azimuthal rotation of the polarization of the light incident on the substrate.

When light that is obliquely incident on the substrate 204, such as rays 218, 220, 230 and 238, is incident on the polarizer 118, the plane of incidence is different from the plane of incidence for light that is normally incident on the substrate 204, such as rays 216, 226 and 236. As a result, the planes of polarization for p-polarized and for s-polarized oblique rays are rotated relative to the planes of polarization for p-polarized and s-polarized normally incident rays. This effect is described in more detail in U.S. Pat. No. 6,486,997, incorporated herein by reference. Consequently, the polarization direction of rays that are obliquely incident on the substrate 204 from the left, for example rays 220 and 230, is rotated clockwise relative to the x-direction. The amount of rotation is dependent on the angle that the ray makes to the normally incident direction, i.e. relative to the z-axis. Likewise, the polarization direction of rays that are obliquely incident on the substrate 204 from the right, for example, rays 218 and 238, is rotated counter-clockwise relative to the x-direction. The rotation of the polarization in the x-y plane is referred to as azimuthal rotation.

The point 214 in the center of the substrate 204 is illuminated symmetrically by oblique rays from the right and left, such as rays 218 and 220, as well as normally incident ray 216. The net effect is that the polarization of the exposed alignment layer at point 214 is parallel to the x-direction. Point 224, on the other hand, at the right edge of the substrate 204 is illuminated by normally incident light 226 and obliquely incident light from the left 230, and so the net effect on the exposed alignment layer is a polarization direction that is rotated clockwise relative to the x-direction. Point 234, at the left edge of the substrate, is illuminated by normally incident light 236 and obliquely incident light 238 from the right, and so the net effect on the exposed alignment layer is a polarization direction that is rotated counter-clockwise relative to the x-direction.

For a UV illumination system having a single light source, 25 cm in length, and exposing a substrate having a width of 30 cm, the polarization direction of the exposed alignment layer may vary by up to about 15°, which is unacceptable for many alignment layer applications. One approach to reducing the rotation of the polarization at the edges of the substrate is to extend the light source well beyond the edges of the substrate so that the edges are uniformly illuminated by oblique light from the right and left. This, however, is wasteful of both light and energy and is, therefore, inefficient. Another approach is to block the oblique light, thus preventing it from reaching the edges of the substrate. This approach is also wasteful of light.

Another approach to reducing the rotation of the polarization at the edges of the substrate is to include edge reflectors. However, many reflectors are substantially less than perfect; losses of intensity occur at reflecting surfaces. The polarization direction of the exposed alignment layer may still vary by up to several degrees, which is still unacceptable for many alignment layer applications.

Different approaches to reducing the azimuthal rotation of the polarization direction, while maintaining high light efficiency, are described below.

One approach to reducing the azimuthal rotation of the polarization is now described with reference to FIGS. 3A and 3B. In this approach, the exposure system 300 includes two polarizers 318a and 318b placed in series. The polarizers may be any suitable type of polarizer, including a polarizer that relies on multiple dielectric layers at Brewster's angle (also referred to as a MacNeille polarizer), a "pile-of-plates" polarizer or a wire grid polarizer.

Light 306 generated by a linear light source 302 passes through the apertures 310 and 314 defined by the pairs of vanes 312 and 316. The linear light source 302 may also comprise a plurality of line light sources, which lie lay substantially along a single axis. For the purposes of this discussion, the light source 102 refers to a single light source or to more than one light source lying substantially along a single axis. A curved reflector 308 may be placed close to the UV light source 302 to reflect light towards the substrate 304. The light 306 passes through the first polarizer 318a and then through the second polarizer 318b before incidence on the substrate 304. The light produced by the light source 302 is actinic, in other words it has a wavelength that produces a chemical reaction in the alignment layer on the substrate 304. One example of a light source 302, suitable for common types of alignment layer, is a UV lamp.

The light 306 is incident on the substrate 304 with reduced polarization rotation. The two polarizers 318a and 318b may have different contrast ratios, selected so that the azimuthal rotation induced by the second polarizer 318b compensates for the azimuthal rotation induced by the first polarizer 318a. The net polarization at different points across the substrate 304 is illustrated in FIG. 3B. The polarization state for light at the center 326, at the right edge 328 and at the left edge 330 is substantially the same, and is parallel to the x-direction. One approach to determining useful values of the contrast ratios of the polarizers 318a and 318b is to calculate the Fresnel reflection and transmission coefficients at each interface and to calculate the polarization state of different rays that propagate from the source 302 to the substrate 304.

Figure 4C:
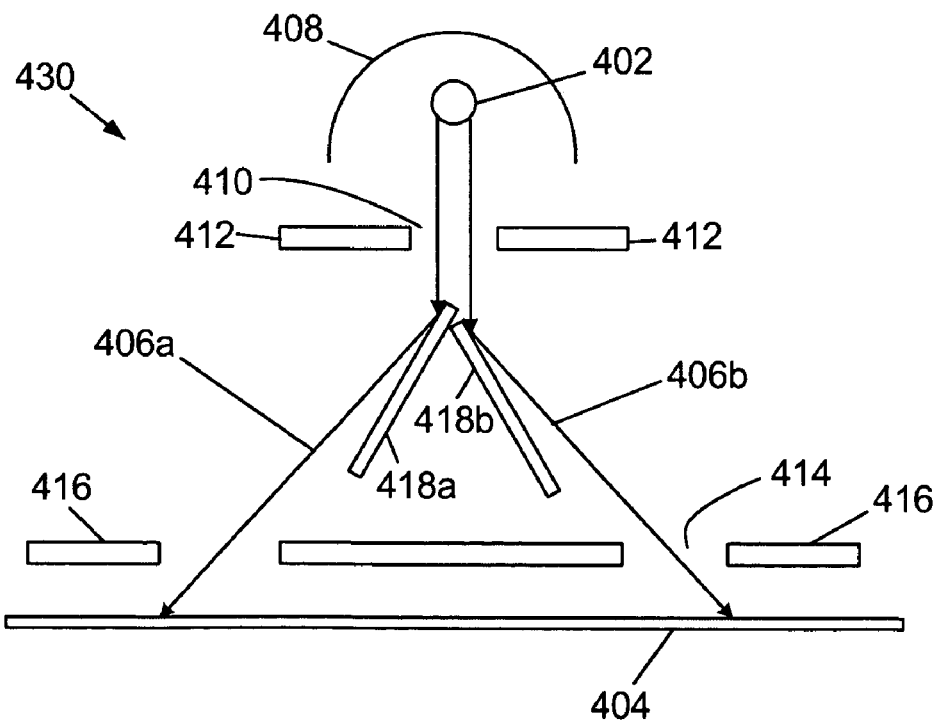
FIG. 4C schematically illustrates another embodiment of a UV exposure system according to principles of the present invention.
Figure 4A:
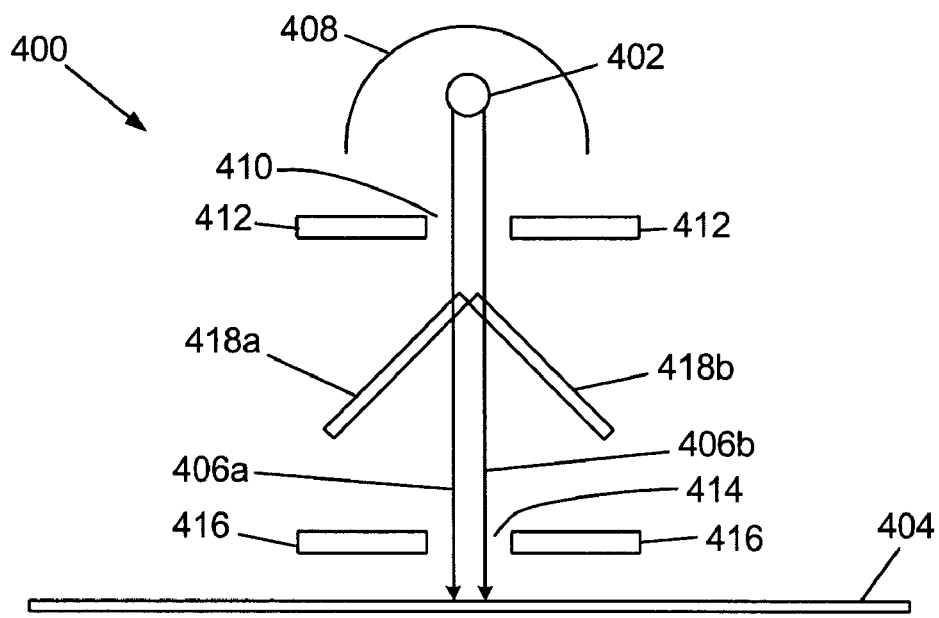
FIG. 4A schematically illustrates another embodiment of a UV exposure system according to principles of the present invention.
Figure 4B:
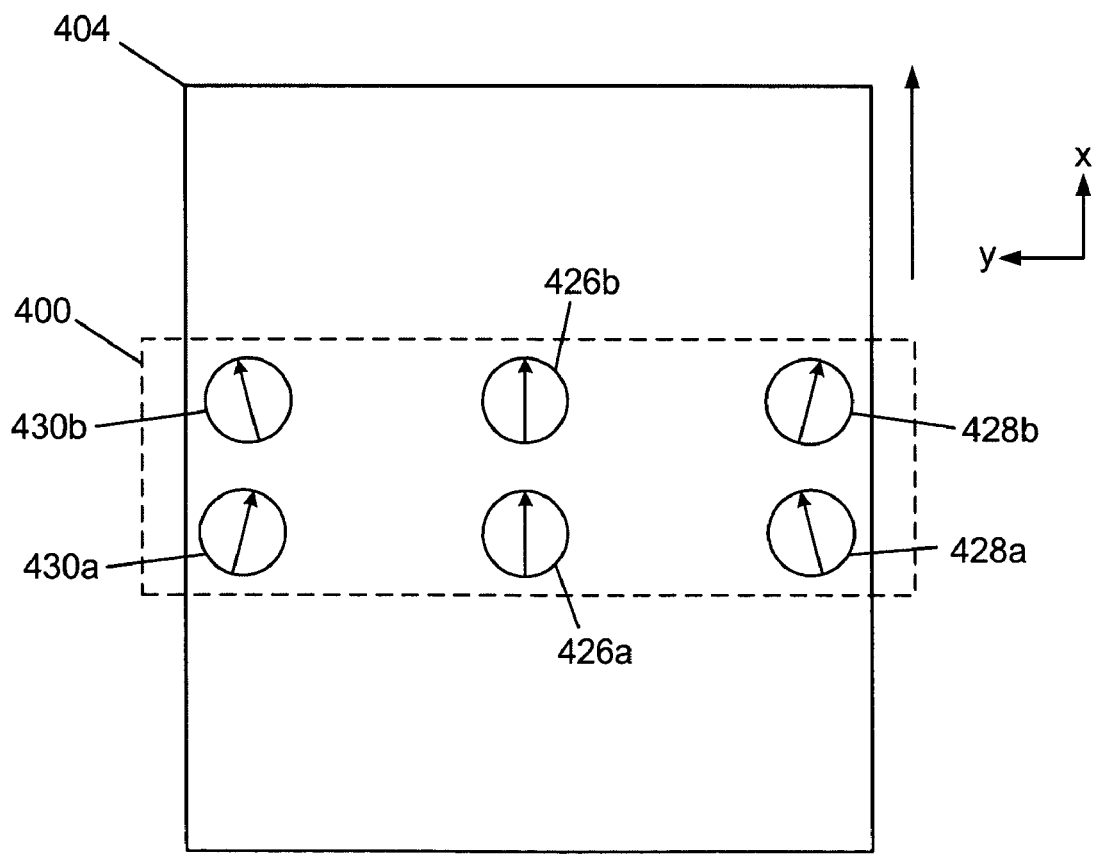
FIG. 4B schematically illustrates a plan view of the system illustrated in FIG. 4A, showing polarization states for light at different points across the exposed substrate.

Another approach is now described with reference to FIGS. 4A and 4B. In this approach, the exposure system 400 includes two polarizers 418a and 418b placed in parallel, and tilted in opposite directions from each other. Light 406 generated by the linear light source 402, such as a UV light source, passes through the apertures 410 and 414 defined by the vanes 412 and 416. A reflector 408 may be placed close to the light source 402 to reflect light towards the substrate 404. Some of the light 406a passes through the first polarizer 418a to the substrate 404 and other light 406b passes through the second polarizer 418b to the substrate 404.

Since the two polarizers 418a and 418b are tilted in opposite directions, the direction of the azimuthal polarization rotation induced by the first polarizer 418a is different from direction of the azimuthal polarization rotation induced by the second polarizer 418b. Thus, while a first oblique ray passing through the first polarizer 418a may have its polarization direction rotated clockwise, the same oblique ray passing through the second polarizer 418b has its polarization direction rotated by the same amount but in a counter-clockwise direction. Thus, light 406a that passes through the first polarizer 418a is incident on the substrate 404 with an azimuthal polarization rotation profile across the substrate 404 shown by polarization directions 426a, 428a and 430a. At the center of the substrate 404, the light 406a is polarized parallel to the x-axis. At the right edge of the substrate 404, the light 406a is polarized generally with a counter-clockwise rotation 428a relative to the x-direction. Likewise, at the left edge of the substrate 404, the light 406a is polarized generally with a clockwise rotation 430a relative to the x-direction.

In addition, light 406b that passes through the second polarizer 418b is incident on the substrate 404 with an azimuthal polarization rotation profile across the substrate 404 shown by polarization directions 426b, 428b and 430b. At the center of the substrate 404, the light 406b is polarized parallel to the x-axis. At the right edge of the substrate 404, the light 406a is polarized generally with a clockwise rotation 428b relative to the x-direction. Likewise, at the left edge of the substrate 404, the light 406a is polarized generally with a counter-clockwise rotation 430b relative to the x-direction.

Since the substrate 404 is moved in the x-direction, the same point on the substrate 404 is exposed to light 406a that passes through the first polarizer 418a and also to light 406b that passes through the second polarizer 418b. Thus, at its edges, the substrate 404 is exposed to light that has a clockwise azimuthal polarization rotation and to light that has a counter-clockwise azimuthal polarization rotation. If the amount of light 406a that passes through the first polarizer 418a is equal to the amount of light 406b that passes through the second polarizer 418b, then the net effect is that the light incident at the edges of the substrate 404 is polarized parallel to the x-direction. Thus, the azimuthal polarization rotation profile arising from the first polarizer 418a may be said to compensate for the azimuthal polarization rotation profile arising from the second polarizer 418b, and vice versa.

The azimuthal rotation of the polarization of the light for different points across the substrate is not unique to p-polarized light and is also encountered when s-polarized light is used. While the descriptions of FIGS. 3A and 4A above addressed various approaches to reducing the azimuthal polarization rotation of p-polarized light incident on the substrate, it will be appreciated that the azimuthal polarization of s-polarized light may also be compensated. For example, in the exposure system 330 schematically presented in FIG. 3C, the s-polarized light may be directed to the substrate by successive reflections off two MacNeille polarizers 318a and 318b, where the direction of the angle of reflection of the first polarizer 318a is opposite the direction of the angle of reflection of the second polarizer 318b. In another example, in the exposure system 430 schematically illustrated in FIG. 4C, two polarizers 418a and 418b may be used to reduce azimuthal polarization rotation, where the s-polarized light 406a and 406b, reflected by the polarizers 418a and 418b, is incident on the substrate 404 and the p-polarized light is blocked by the vanes 416.

Figure 5:
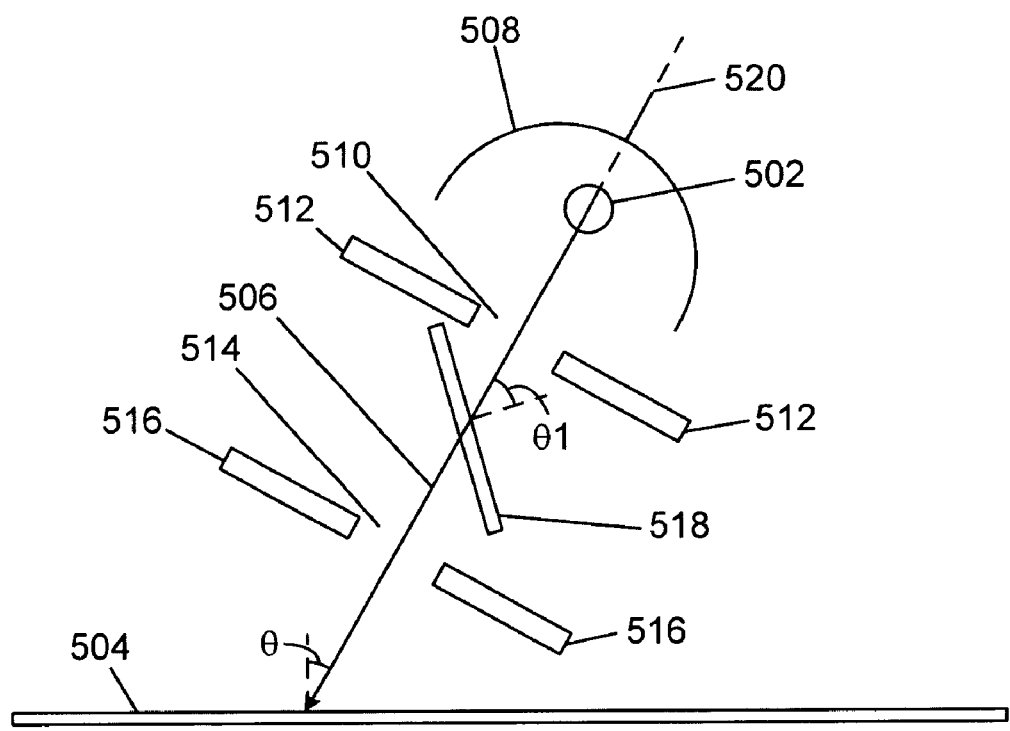
FIG. 5 schematically illustrates a prior art UV exposure system tilted relative to the substrate being exposed.

A relative tilt may be introduced between the exposure system and the substrate, for example as is now described with reference to FIG. 5. One advantage of introducing the relative tilt is to expose the alignment layer in a manner that introduces pre-tilt to the subsequent alignment layer. The relative tilt may be introduced by rotating the substrate or the exposure system. In many manufacturing systems, where the substrate is formed by a continuously moving web of film, it is often easier to tilt the exposure system. When tilt is discussed herein, however, it should be understood that the tilt may be introduced by tilting either the exposure system or the substrate, or both.

The prior art tilted exposure system 500 includes a linear UV source 502 that illuminates the substrate 504 with UV light 506. A reflector 508 may be used to reflect light towards the substrate 504. The light 506 passes through apertures 510 and 514 defined by pairs of vanes 512 and 516. A single polarizer 518 is positioned between the pairs of vanes 512 and 516. The angle, θ, is defined as the angle between the axis 520 of the exposure system 500 and the normal to the substrate 504.

It has been found that the azimuthal rotation of the polarization direction is dependent on the tilt angle between the exposure system and the substrate being exposed, as is now discussed with reference to FIGS. 6A and 6B. The azimuthal rotation of the polarization of an Elsicon OptoAlign™ system was measured using the following procedure. A glass slide was spin coated with linear photopolarizable polymer (Staralign 2110, manufactured by Huntsman Advanced Materials, Basel, Switzerland) as the alignment layer and then annealed in an oven for 10 minutes at 180° C. Sections of the glass slide were masked and then exposed at various locations, corresponding to different positions across the substrate, and at various tilt angles. A liquid crystal polymer (LCP) (CB 483, also manufactured by Huntsman Advanced Materials.) was then spin coated on the exposed alignment layer and annealed for 5 minutes at 50° C. The LCP layer was then cross-linked by flood exposure by ultraviolet light. The orientation of the LCP layer on the glass slide was then measured using an ellipsometer. It is estimated that the accuracy in this measurement is that the azimuthal polarization rotation angle is within ±1°.

Figure 6A:
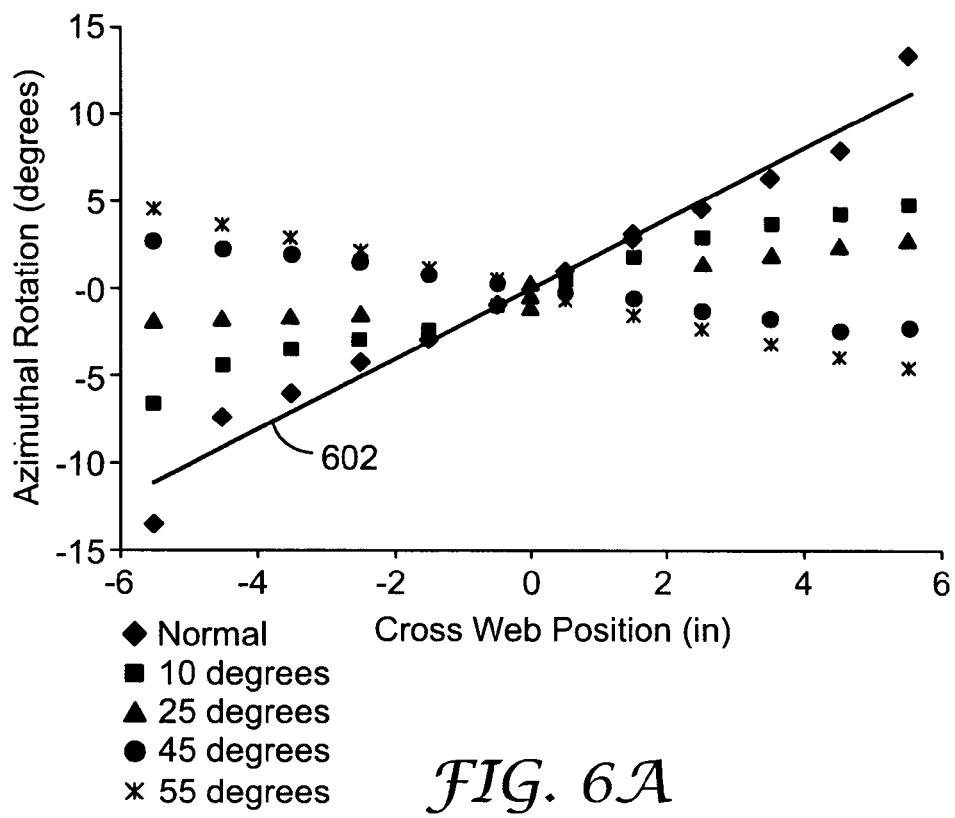
FIGS. 6A and 6B present graphs showing the dependence of azimuthal polarization rotation on position across the substrate being exposed and tilt angle.

The azimuthal orientation of the LCP layer determined using this procedure is shown in FIG. 6A, plotted against the effective position across the substrate, for tilt angles of 0°, 10°, 25°, 45° and 55°. At normal incidence, curve 602, the azimuthal rotation is most pronounced, going from about +12° to about −12° across the substrate. As the tilt angle is increased, the amount of azimuthal rotation is reduced. For tilt angles up to 25°, the sense of the azimuthal polarization rotation is the same as at normal incidence, being positive for positions to the left of center of the substrate and negative for positions to the right of center. For tilt angles of 45° and above, however, the sense of the azimuthal polarization rotation changes, being negative for positions to the left of center and positive for positions to the right of center. This suggests that, at a tilt angle of around 35°, the azimuthal polarization rotation is close to being zero across the width of the substrate.

Figure 6B:
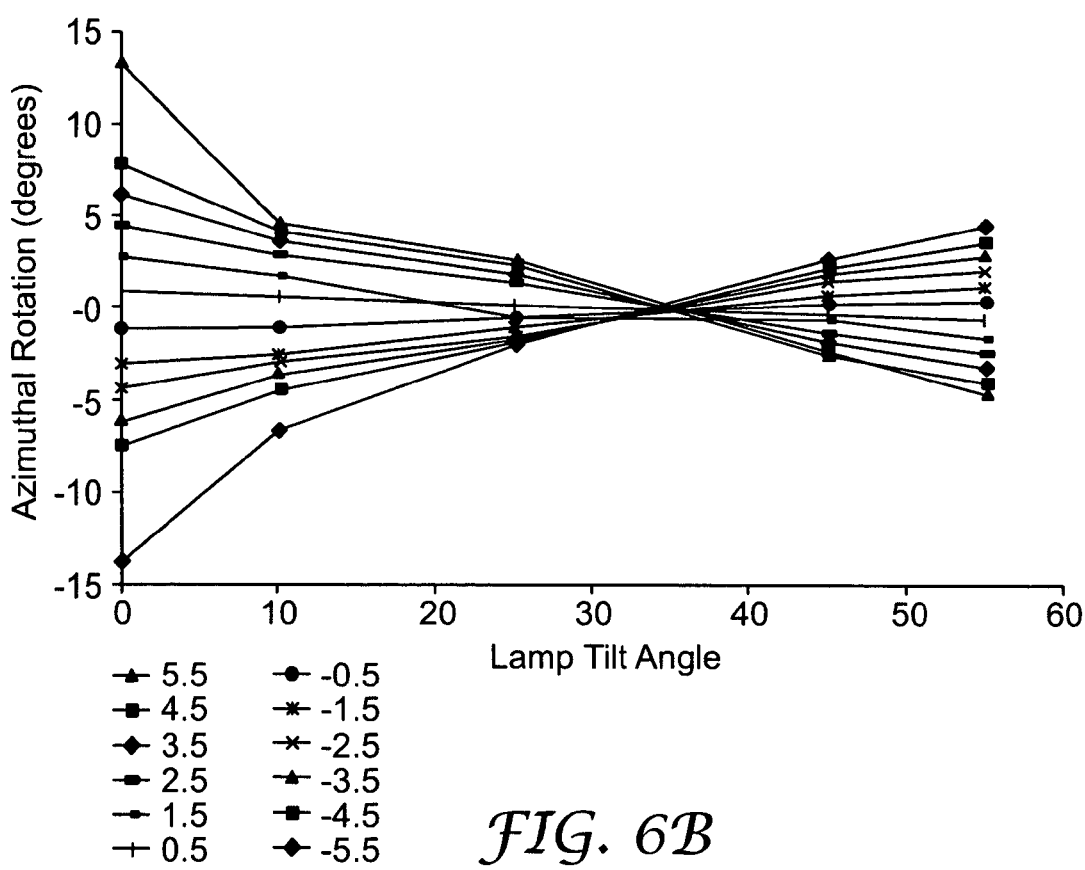

This may be seen more easily in FIG. 6B, which plots the azimuthal angle of rotation against inclination angle, for different positions across the substrate. As can be seen, the spread in azimuthal rotation comes to a minimum at a tilt angle of about 35°. Accordingly, the effect of azimuthal polarization rotation may be reduced, if not eliminated, by careful selection of the tilt angle.

It is believed that the compensation of the azimuthal polarization rotation by tilting the UV exposure system is due to the substrate acting as a second MacNeille polarizer, albeit an inefficient one. Since the angle, θ, between the incident light and the substrate has the opposite sense to the angle, θ1, between the polarizer and the incident light, the refraction of the substrate acts in a manner similar to the second polarizer of the system shown in FIG. 3A.

The tilt angle at which the azimuthal polarization rotation is compensated depends on various factors including, but not limited to, the refractive index of the alignment layer and the angle, θ1, of the polarizer. Accordingly, the value of tilt angle of 35°, described above with respect to FIG. 6B to give minimal azimuthal polarization rotation, should be understood to be a value that is dependent on the operating conditions of the exposure system.

This approach to compensating for the azimuthal polarization rotation, however, only provides compensation for one particular tilt angle. Another approach to compensating for the azimuthal polarization rotation when the light source is tilted relative to the substrate is now discussed with reference to FIGS. 7A and 7B. In the exposure system 700, light 706 from the lamp 702 is incident on the substrate 704 through a first polarizer 718. The central ray 706a is defined as the average direction of light incident on the substrate 704. Two sets of vanes 710 and 714 may optionally be used to reduce the divergence of the light 706 incident on the substrate 704.

Two angles are defined in the figures. The first angle, θ1, is the tilt angle of the exposure system 700 relative to the substrate 704, and is defined as the angle between the central ray 706a from the light source 702 and the normal 720 to the substrate 704. In FIG. 7A, the tilt angle θ1=0°, and in FIG. 7B, the illumination system 700 has been rotated so as to form a non-zero tilt angle, θ1.

An optically transparent element 722 is disposed with at least one surface 724 forming a second angle, θ2, the angle between the normal to the surface 724 and the central ray 706a. The optically transparent element 722 may be any suitable transparent element that passes the light 706 to the substrate 704. The optically transparent element 722 may be, for example, a stack of one or more plates, such as quartz or fused silica plates. The optically transparent element 722 may also be a polarizer, for example a MacNeille polarizer or a wire grid polarizer. The optically transparent element 722 may be disposed between the first polarizer 718 and the aperture plates 714, or between the aperture plates 714 and the substrate 704.

The optically transparent element 722 may also be used in other embodiments, for example where the first polarizer 718 is used to reflect s-polarized light to the substrate 704, as is schematically illustrated in FIG. 7C. In such a case, the optically transparent element 722 may be placed in the path of s-polarized light 706b, between the first polarizer 718 and the substrate 704.

Figure 3A:
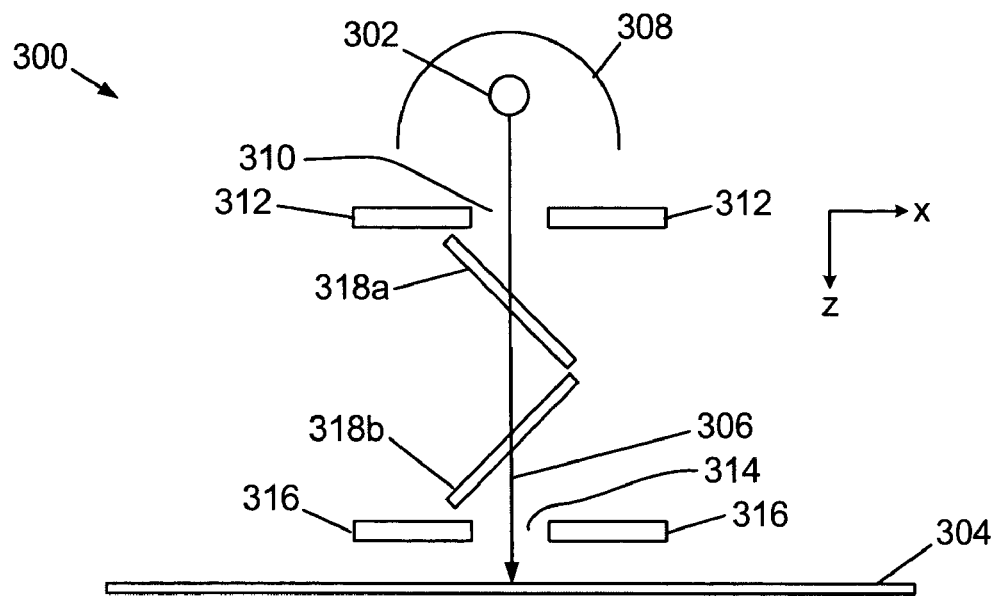
FIG. 3A schematically illustrates an embodiment of a UV exposure system according to principles of the present invention.
Figure 3B:
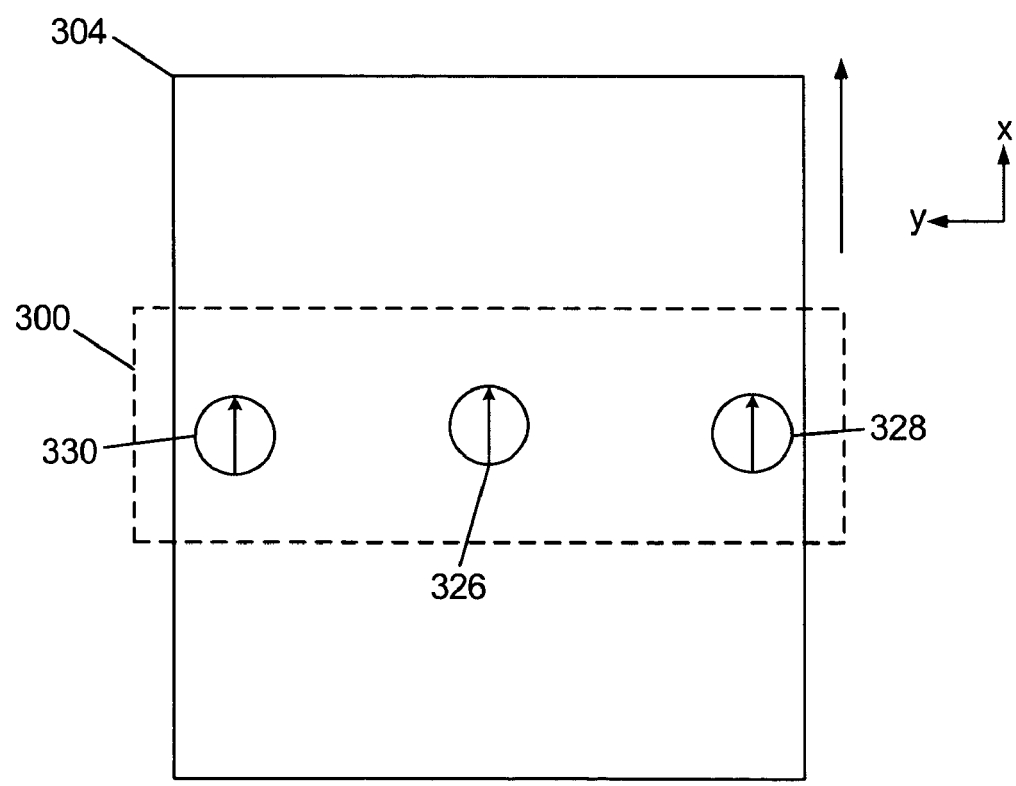
FIG. 3B schematically illustrates a plan view of the system illustrated in FIG. 3A, showing polarization states for light at different points across the exposed substrate.
Figure 3C:
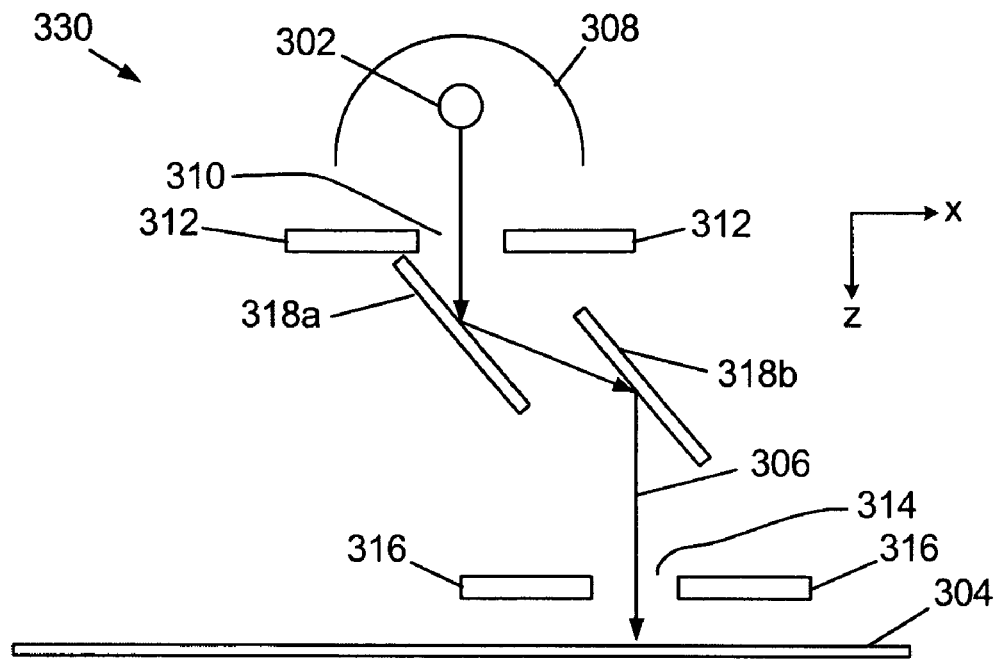
FIG. 3C schematically illustrates another embodiment of a UV exposure system according to principles of the present invention.

Recall, in the discussion above with reference to FIGS. 3A and 3B, where the optically transparent element 722 is a second polarizer, that when θ1=0°, then the azimuthal polarization rotation may be compensated if the second polarizer is selected correctly. Correct selection of the second polarizer 722 includes selection of the contrast ratio and angle θ2. When the entire exposure system 700 is tilted relative to the substrate 704, so as to increase the tilt angle, θ1, it is found that the system no longer compensates for the azimuthal polarization rotation across the substrate, if both θ1 and θ2 are kept constant. However, the second polarizer may be rotated, so as to change θ2, to a position where the azimuthal polarization rotation is compensated. The tilt angle, θ1, may be changed to different values: a concomitant rotation of the second polarizer substantially maintains compensation for the azimuthal polarization rotation. Table I presents calculated values for tilt angle, θ1, and second polarizer angle, θ2, to maintain substantially zero azimuthal polarization rotation. The second polarizer angle, θ2, is given relative to that value that compensates the azimuthal polarization rotation when the tilt angle is zero.

TABLE I

Combinations of Tilt Angle and Second Polarizer Angle for Compensated Azimuthal Polarization Rotation

| Tilt angle, θ1 | Second polarizer angle, θ2 |
|---|---|
| 0° | 0° |
| 30° | 42° |
| 45° | 56° |

The optically transparent element 722 need not be a second MacNeille polarizer, however, and other elements may be used, for example, one or more quartz plates or a wire grid polarizer.

EXAMPLE 1

Figure 8:
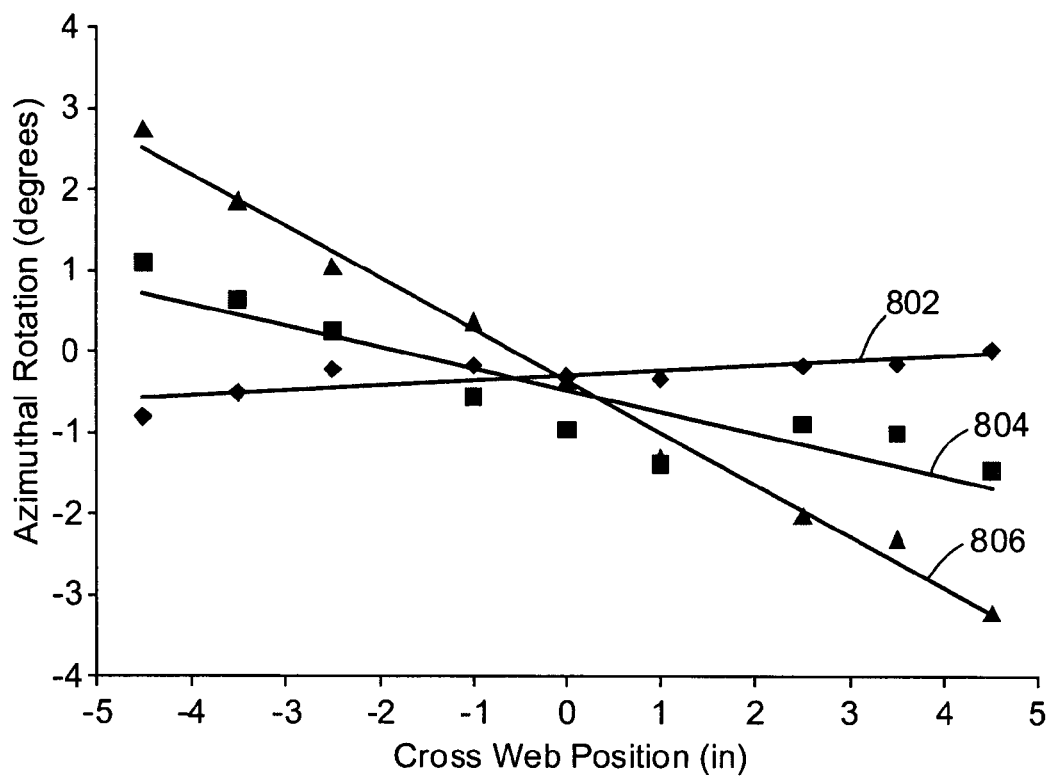
FIG. 8 presents a graph showing azimuthal polarization rotation as a function of position across a substrate for various tilt angles.

FIG. 8 presents a graph showing azimuthal polarization rotation as a function of cross-web position where the optically transparent element 722 is a wire grid (WG) polarizer. The values of the azimuthal polarization rotation were measured using the technique discussed above with regard to FIGS. 6A and 6B. The values of the tilt and second angles are provided in Table II for each of the curves shown in FIG. 8.

TABLE II

Combinations of Tilt Angle and WG Polarizer Angle in FIG. 8

| Curve No. | Tilt angle, θ1 | WG polarizer angle, θ2 |
|---|---|---|
| 802 | 0° | 15° |
| 804 | 15° | 15° |
| 806 | 30° | 15° |

FIG. 8 shows that the azimuthal rotation of the polarization is less than 1° over the width of the substrate when the tilt angle, θ1, is zero and the WG polarizer is set at θ2=15°. Interpolation of these results suggests that the azimuthal rotation is compensated when the tilt angle, θ1, is in the range 2°-10°. It will be appreciated that the WG polarizer may be tilted to other values of θ2 so as to provide compensation for the azimuthal polarization rotation at different tilt angles.

EXAMPLE 2

Figure 9A:
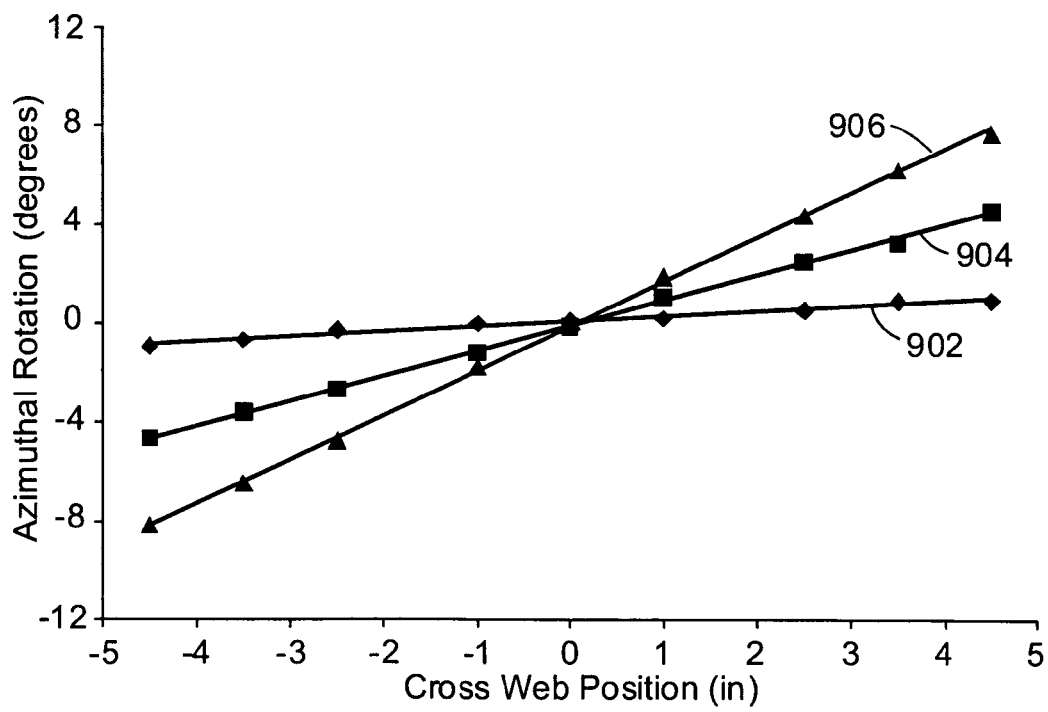
FIGS. 9A and 9B present graphs showing azimuthal polarization rotation as a function of position across a substrate for various tilt angles and compensator angles.
Figure 9B:
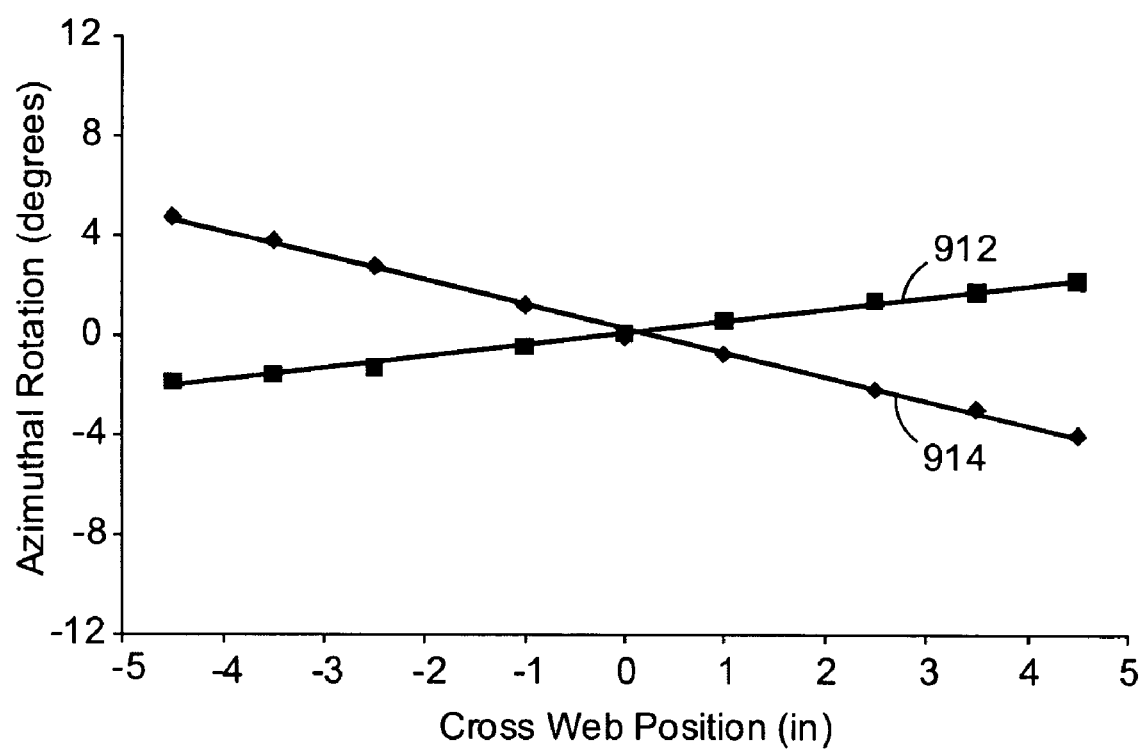

FIGS. 9A and 9B present graphs showing azimuthal polarization rotation measured against cross-web position where the optically transparent element 722 is a stack of five quartz plates, each 3.2 mm thick. The values of the azimuthal polarization rotation were measured using the technique discussed above with regard to FIGS. 6A and 6B. The values of the tilt and second angles are provided in Table III for each of the curves shown.

TABLE III

Combinations of Tilt Angle and Quartz Plate Angle in FIGS. 9A and 9B

| Curve No. | Tilt angle, θ1 | Second angle, θ2 |
|---|---|---|
| 902 | 0° | +30° |
| 904 | 0° | 0° |
| 906 | 0° | −30° |
| 912 | 45° | −30° |
| 914 | 45° | +30° |

FIG. 9A shows that the azimuthal rotation of the polarization is less than about ±1° over the width of the substrate when the tilt angle, θ1, is zero and the quartz plates are set at θ2=−30°. Extrapolation of these results suggests that the azimuthal rotation is compensated for normal incidence when the second angle, θ2, is in the range −30° to −40°.

FIG. 9B shows that the azimuthal rotation of the polarization is less than about ±2° over the width of the substrate when the tilt angle, θ1, is 45° and the quartz plates are set at θ2=−30°. Interpolation of these results suggests that the azimuthal rotation is compensated when the tilt angle is 45° and the second angle, θ2, has a value of in the range −5 to −15°. The stack of quartz plates may be tilted to other values of θ2 so as to provide compensation for the azimuthal polarization rotation at different tilt angles.

Thus, a transparent optical element 722 may effectively be used as a compensation element for compensating for the azimuthal polarization rotation of the illumination source at different tilt angles. Furthermore, different types of optical elements may be used as the compensation element, including MacNeille and WG polarizers and a stack of quartz plates, as is now discussed in Examples 3 and 4.

EXAMPLE 3

Figure 10A:
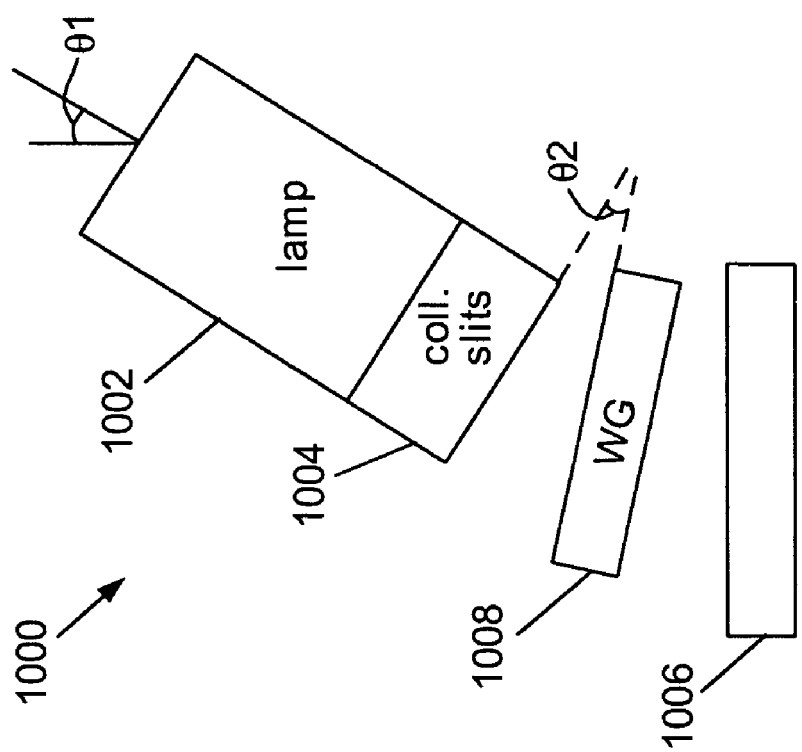

Another configuration of UV exposure system is schematically presented in FIG. 10A. The exposure system 1000 comprises a lamp assembly 1002 with an arrangement of collimator slits 1004 to define the divergence of the light incident on the substrate 1006. A single wire grid polarizer 1008 is disposed between the lamp assembly 1002 and the substrate 1006. It is suggested in U.S. Patent Application Publication No. 2004/0008310 A1 that different polarizer angles, θ2, may be used when the lamp assembly 1002 is tilted away from normal incidence (θ1=0°). This possibility was explored by measuring the azimuthal polarization of the light incident on the substrate 1006 for a number of different tilt angles, θ1, and polarizer angles, θ2.

Figure 10B:
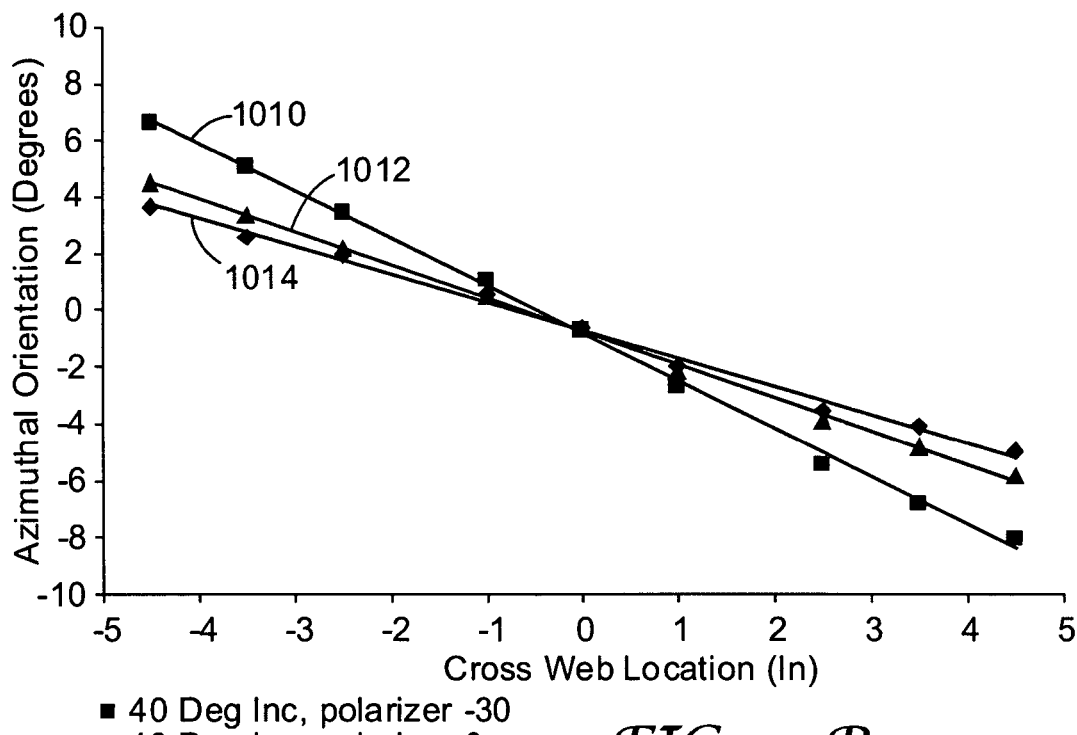
FIGS. 10B and 10C present graphs showing azimuthal polarization rotation as a function of position across a substrate for various tilt angles and polarizer angles for the exposure system illustrated in FIG. 10A.

FIG. 10B shows the measured azimuthal rotation of the polarization across the substrate 1006 for a tilt angle, θ1, of 40°, and for polarizer angles, θ2, of −30° (curve 1010), 0° (curve 1012) and +30° (curve 1014). As can be seen from the data, the azimuthal polarization rotation is slightly reduced when the WG polarizer 1008 is rotated from 0° to +30°, however, there is still substantial polarization rotation across the substrate. Rotating the WG polarizer 1008 to −30° increases the azimuthal polarization rotation.

Figure 10C:
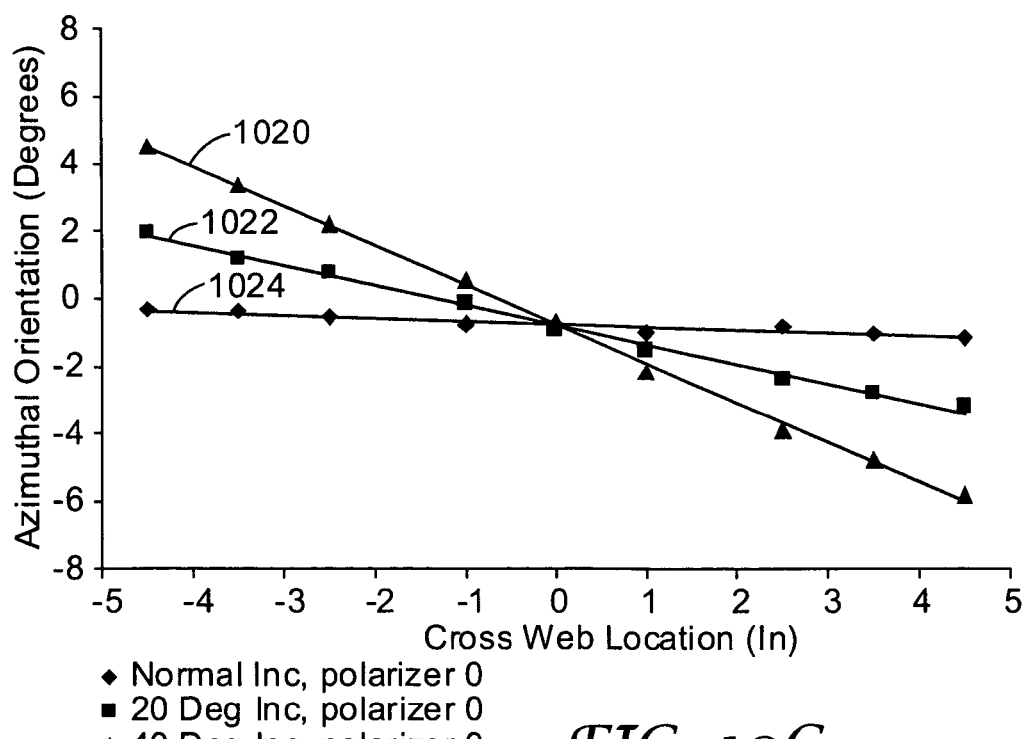

FIG. 10C shows the azimuthal rotation of the polarization across the substrate 1006 when the WG polarizer 1008 is set at a polarizer angle of 0° and where the tilt angle, θ1, has a value of 0° (curve 1020), 20° (curve 1022) and 40° (curve 1024). The when the tilt angle, θ1, is zero, the azimuthal polarization rotation is small, varying by approximately +0.5° across the substrate. The variation in polarization rotation across the substrate 1006 increases with increasing tilt angle, θ1.

EXAMPLE 4

Figure 11A:
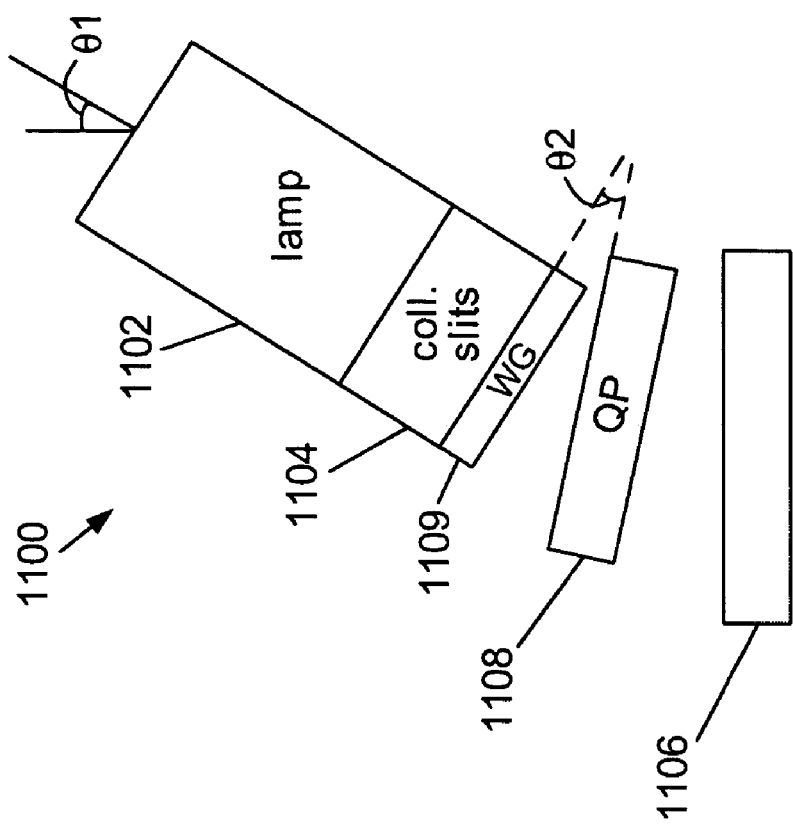
FIGS. 10A and 11A schematically illustrated different embodiments of UV exposure systems according to principles of the present invention.

Another configuration of UV exposure system is schematically presented in FIG. 11A. The exposure system 1100 comprises a lamp assembly 1102 with an arrangement of collimator slits 1104 to define the divergence of the light incident on the substrate 1106. A stack of quartz plates (QP) 1108 is disposed between the lamp assembly 1102 and the substrate 1106. Each quartz plate was 3.2 mm thick. The azimuthal polarization of the light incident on the substrate 1106 was measured for a number of different tilt angles, θ1 and plate angles, θ2. The plate angle, θ2, is zero when the central ray from the light assembly is normally incident on the quartz plates. A wire grid polarizer 1109 was maintained normal to the central ray of the light from the lamp assembly 1102.

Figure 11B:
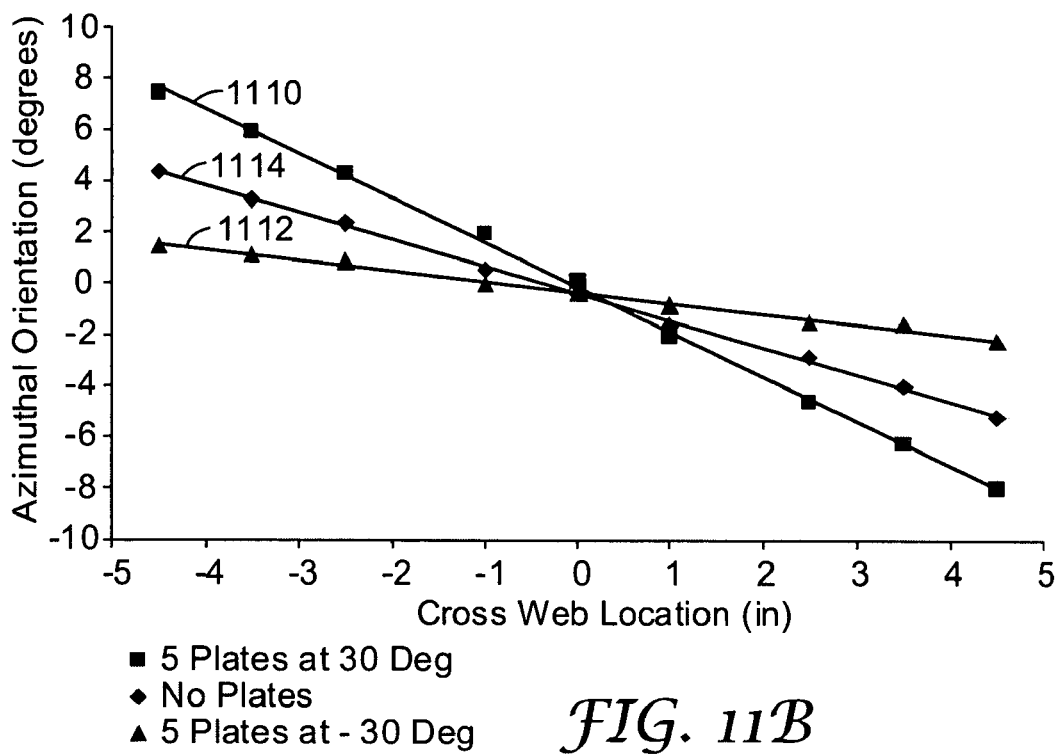
FIGS. 11B and 11C present graphs showing azimuthal polarization rotation as a function of position across a substrate for various tilt angles and plate angles for the exposure system illustrated in FIG. 11A.

FIG. 11B shows the azimuthal rotation of the polarization across the substrate 1106 when the tilt angle θ1 is 40°, the stack contains five quartz plates and is disposed at a plate angle θ2 of +30° (curve 1110) and –30° (curve 1112). For comparison, the azimuthal polarization rotation is also shown when no quartz plates are present (curve 1114). As can be seen, the polarization rotation is reduced when the quartz plates are rotated to –30° relative to the case with no quartz plates. The quartz plates at +30°, however, increase the azimuthal polarization rotation.

Figure 11C:
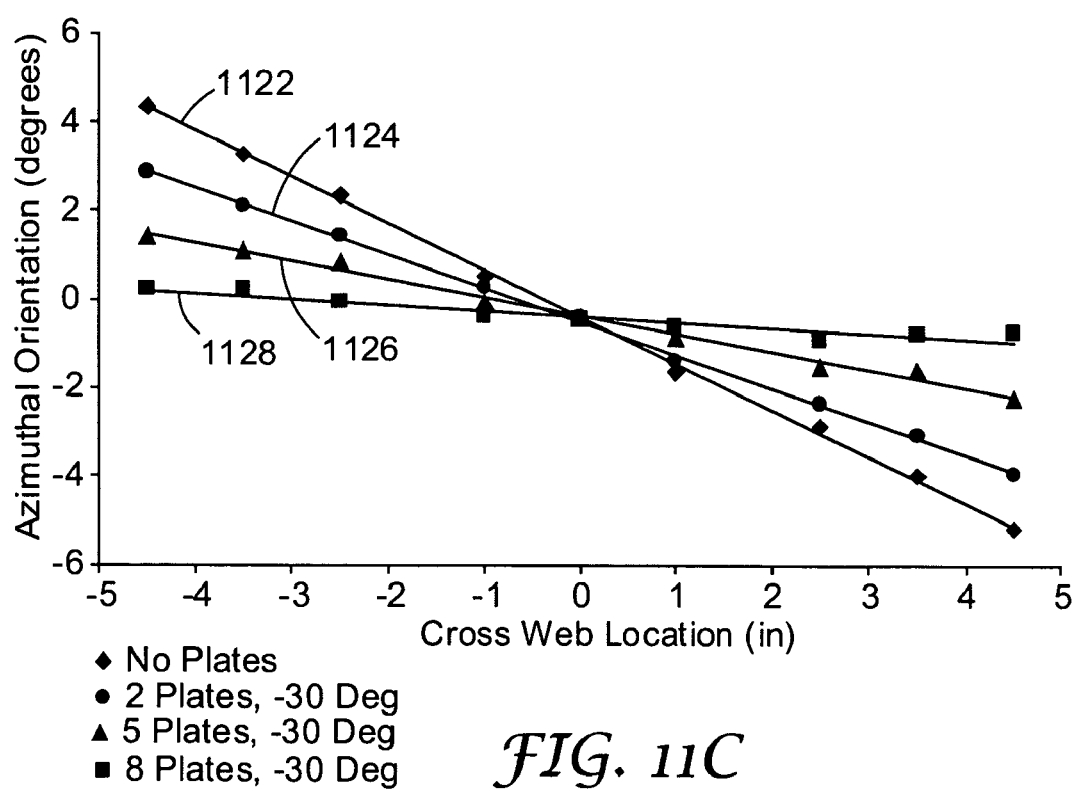

FIG. 11C shows the azimuthal rotation of the polarization across the substrate 1106 when the tilt angle, θ1, is 40° and the angle θ2 is –30°, for different numbers of plates. The curve 1122 represents the case when no quartz plates were present, curve 1124 represents the case when 2 plates were used, curve 1126 corresponds to 5 plates being used and curve 1128 corresponds to the stack containing 8 plates. The disposition of quartz plates at –30° reduces the azimuthal polarization rotation and, when the stack 1108 contains eight plates, the azimuthal polarization rotation is limited to a value of less than ±1° across the substrate 1106. It will be appreciated that other combinations of plate angle and quartz plate number may be used to control the azimuthal polarization rotation. For example, a smaller number of plates set at a higher angle than –30° may also be used to compensate for the azimuthal polarization rotation.

The prior art UV exposure system shown in FIG. 1 has only two apertures aligned across the substrate to control the divergence of the light illuminating the substrate in a direction along the substrate, parallel to the x-direction. There is no restriction on the divergence of the light in the direction across the substrate, parallel to the y-direction. Baffles may be placed along the length of the UV light source to restrict the divergence of light across the substrate, but these simply reduce the overall illumination efficiency of the system by blocking the highly oblique rays.

A reflective collimator may be used to restrict the divergence of the light across the substrate and/or along the substrate. Such a device may be used to increase the amount of light incident on the substrate and also to reduce the amount of azimuthal polarization rotation by reducing the obliqueness of the light incident on the polarizer. In general, such a collimator may comprise a reflective structure having one or more apertures through which the light from the lamp passes into respective one or more tapered sections. The tapered sections comprise tilted reflective walls that direct the light incident thereon in a direction more closely to a normal to the substrate.

One particular embodiment of reflective collimator is now described with reference to FIGS. 12A-12D. A side view of the illumination system 1200 is presented in FIG. 12A. A curved reflector 1208 is disposed around part of the linear light source 1202. The reflector 1208 may take on different shapes including, but not limited to parabolic or elliptical. Some light 1206a is incident on the substrate 1204 directly from the light source 1202. Other light 1206b may be reflected by the reflector 1208 to the substrate 1204. A reflective assembly 1210 is disposed between the light source 1202 and the substrate 1204. The reflective assembly 1210 may have upper reflecting surfaces 1212 that reflect light back towards the light source 1202 and reflector 1208.

The reflective assembly 1210 also defines a number of apertures 1214 that are tapered in the z-direction. The aperture walls 1216 are reflective, so that light 1206b incident on the 1216 walls is reflected towards the substrate 1204. Furthermore, since the walls 1216 are tapered, the angle of incidence of the light 1206b on the substrate 1204 is less than it would be if the reflective walls 1216 were not present. Accordingly, the divergence of the light incident on the substrate 1204 is reduced in the x-z plane. Where the reflector 1208 is elliptical, the light collection efficiency may be increased where the light source 1202 is positioned at one focus of the ellipse and the second focus of the ellipse is positioned close to the point marked "F", approximately half way across the aperture 1214 and in the plane of the reflecting surfaces 1212.

A polarizer 1218 may be positioned between the collimator assembly 1212 and the substrate 1204. The polarizer 1218 may be a wire-grid-type polarizer (as illustrated), or may be a MacNeille-type polarizer or another type of polarizer.

Figure 12A:
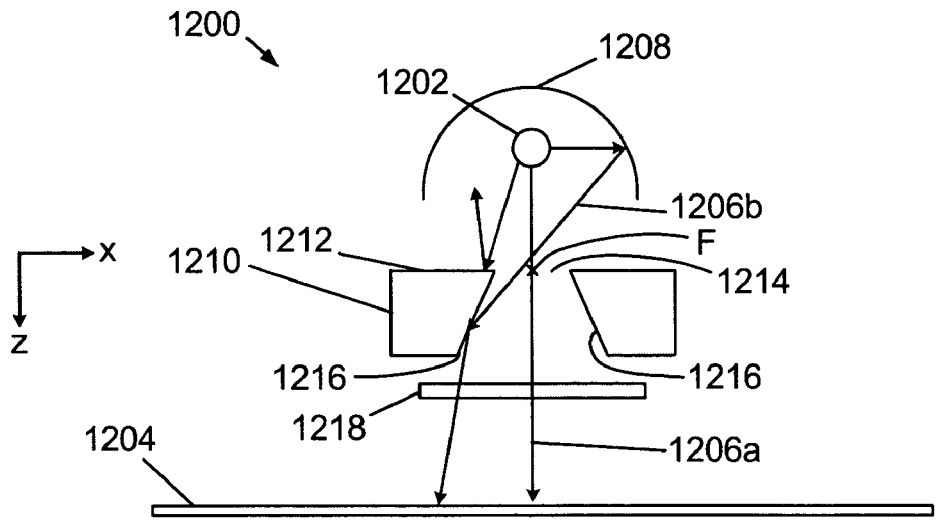
FIGS. 12A and 12B schematically illustrate one embodiment of a UV exposure system that includes a reflective light concentrator, according to principles of the present invention.
Figure 12B:
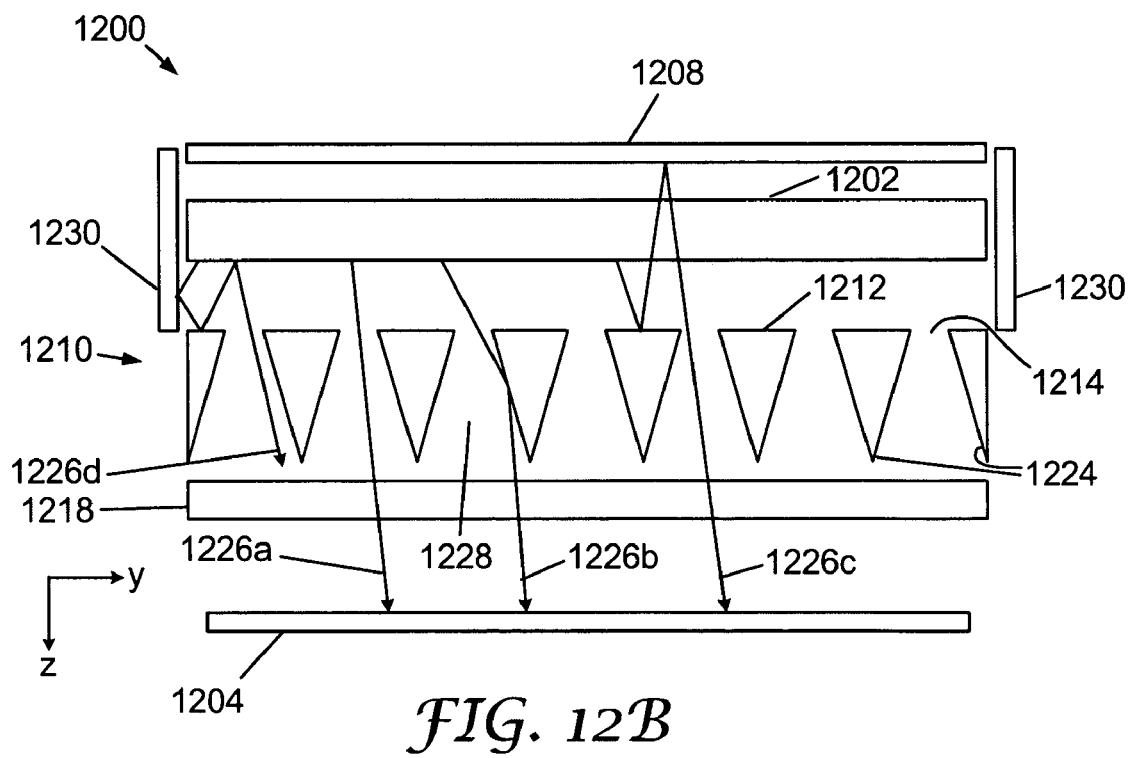

A view of the illumination system 1200 across the substrate is shown in FIG. 12B. The reflective assembly 1210 has a reflective upper surface 1212, which may be flat and parallel with the light source 1202, and angled reflective surfaces 1224. Some light 1226a from the light source 1202 is directly incident on the substrate 1204 through the apertures 1228 between the reflective surfaces 1224. Some other light 1226b is reflected by the angled reflective surfaces 1224 before incidence on the substrate. Since the reflective surfaces 1224 are angled with respect to the z-direction, the light 1226b is incident on the substrate at an angle that is less oblique than it would otherwise have been had the reflective assembly 1210 not been present. Some of the light 1226c is reflected by the reflective surfaces 1212 back to the reflector 1208, and then reflected again back towards the substrate 1204. End reflectors 1230 may be provided at the ends of the exposure system 1200 to reflect light 1226d that would otherwise pass out of the ends of the system 1200.

Figure 12C:
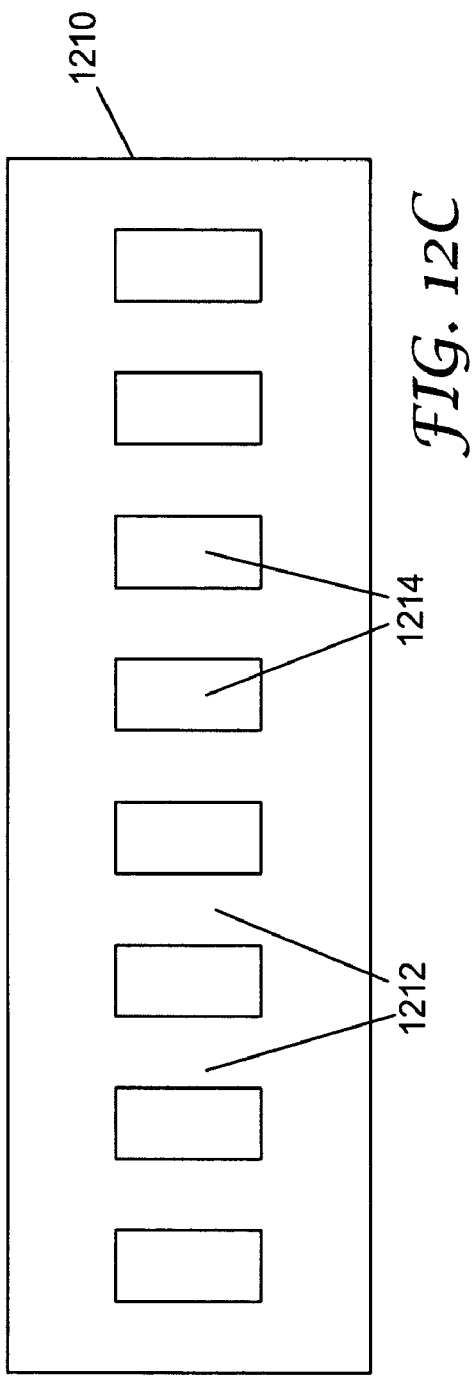
FIGS. 12C and 12D schematically illustrate one embodiment of a reflective light concentrator, according to principles of the present invention.
Figure 12D:
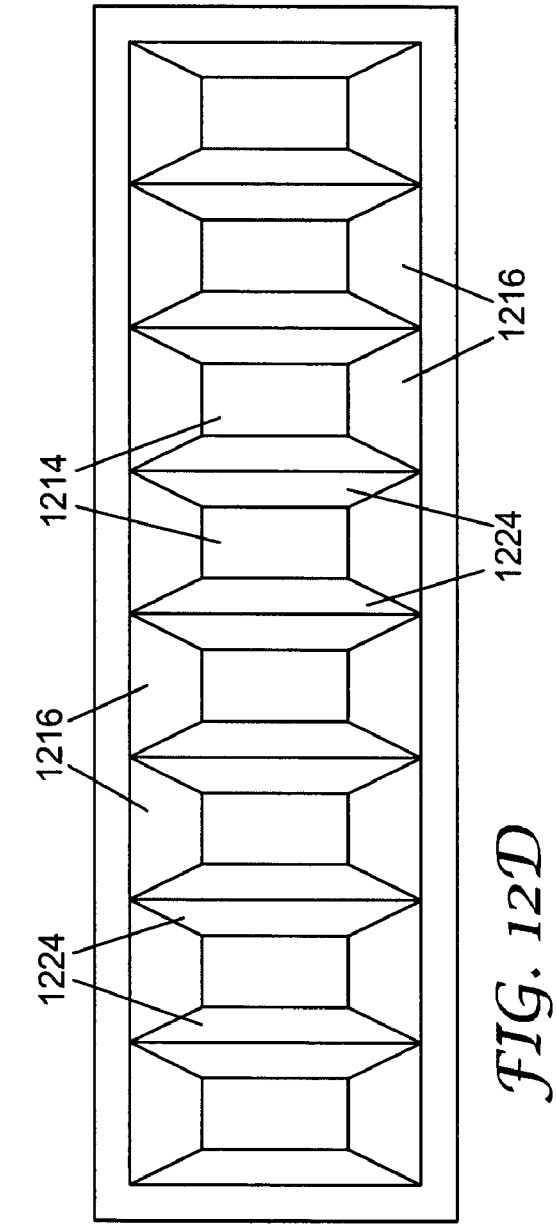

The upper and lower surfaces of the reflective assembly 1210 are shown in FIGS. 12C and 12D. The upper surface of the reflective assembly 1210 is illustrated in FIG. 12C, showing the apertures 1214 and the reflecting upper surface 1212. The lower surface of the reflective assembly is shown in FIG. 12D, showing the apertures 1214 and the reflective surfaces 1216 and 1224. It will be appreciated that the number of apertures need not be limited to eight, and that there may be more or fewer apertures.

Figure 12E:
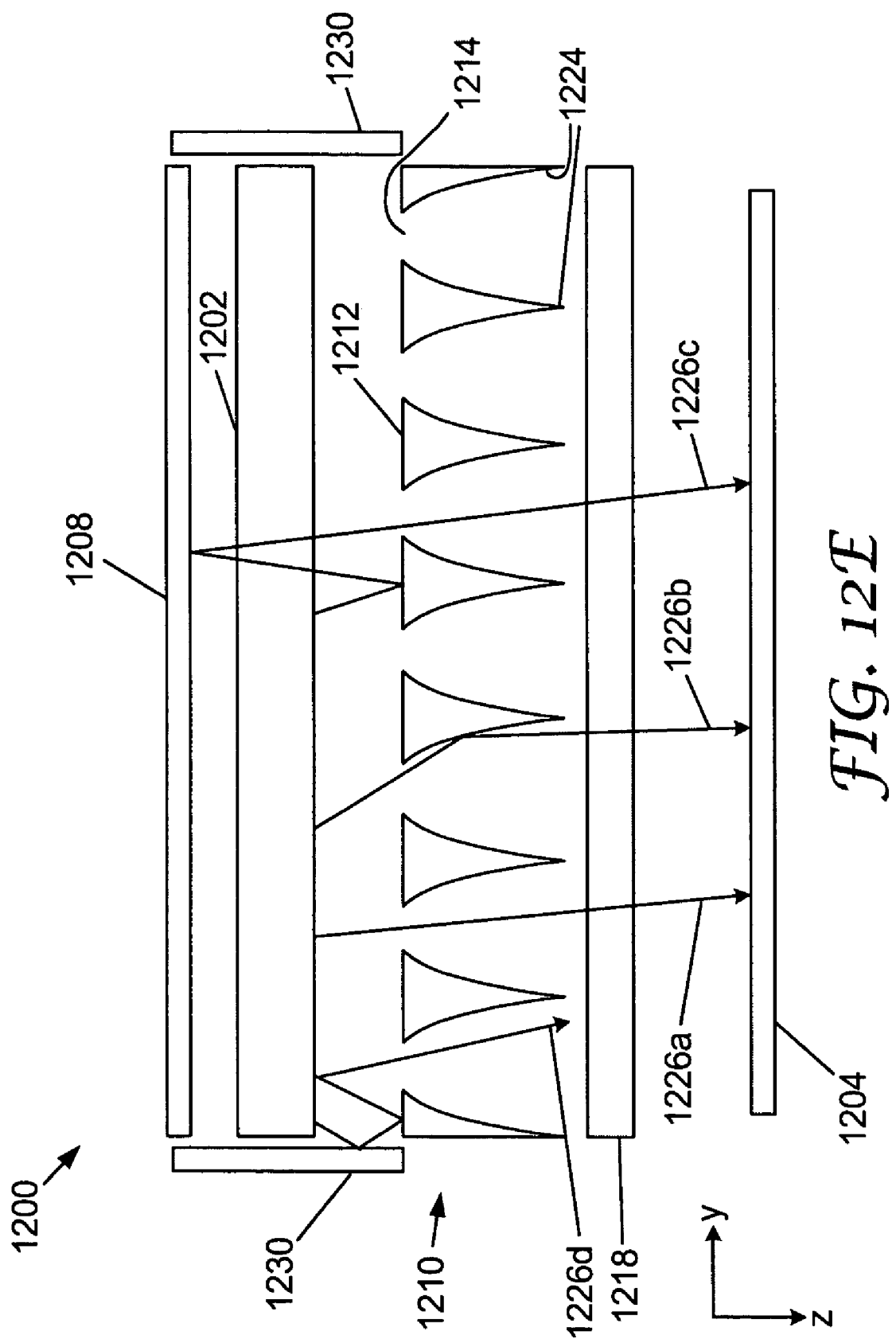
FIG. 12E schematically illustrates another embodiment of a UV exposure system that includes a reflective light concentrator, according to principles of the present invention.

The reflective surfaces 1216 and 1224 need not be flat and may take on a different profile. For example, the reflective surfaces 1224 may be curved, as shown in FIG. 12E. Other curved shapes may be used, for example convex or concave curves. Also, the reflective surfaces 1224 need not all have the same profile. For example, one of the reflective surfaces 1224 may have a first profile and another reflective surface 1224 may have a second profile different from the first profile.

EXAMPLE 5

A reflective assembly 1210 was manufactured from a stainless steel base having reflective surfaces 1212, 1216 and 1224 formed from Miro-Silver®, available from Alanod GmbH, Ennepetal, Germany. The Miro-Silver® material was originally provided in sheet form, and is based on a layer of aluminum, with a layer of high purity silver and a reflective oxide layer provided on one surface. The reflective assembly included eight apertures, each 4.3 cm in the x-direction and 1.25 cm in the y-direction. The apertures were set at a center-to-center pitch of 3.4 cm. The reflective walls 1216 and 1224 were set at an angle of 15° from the z-direction.

Experiments were performed to evaluate the ability of the reflective assembly to efficiently direct light from the lamp to the substrate. These experiments were performed using a modified Elsicon OptoAlign™ illumination system having a 10" long UV lamp. The UV lamp was operated with 600 W of input microwave power, and the integrated UV energy was measured for different positions across the substrate in the y-direction. The UV energy was measured by placing a UV radiometer (UV Power Puck, produced by EIT Inc., Sterling, Va.) in place of the substrate. The UV radiometer was placed on a table that was translated in the x-direction past the illumination from the lamp. The translation speed of the table in all experiments was 25.4 mm/sec. The distance from the lamp to the radiometer, in the z-direction, could be varied. The lamp was operated with a tilt angle of 0°. The measurements were repeated at regular intervals across the y-direction to determine the illumination profile on a substrate. A wire grid polarizer was placed between the reflective assembly and the radiometer.

Figure 13:
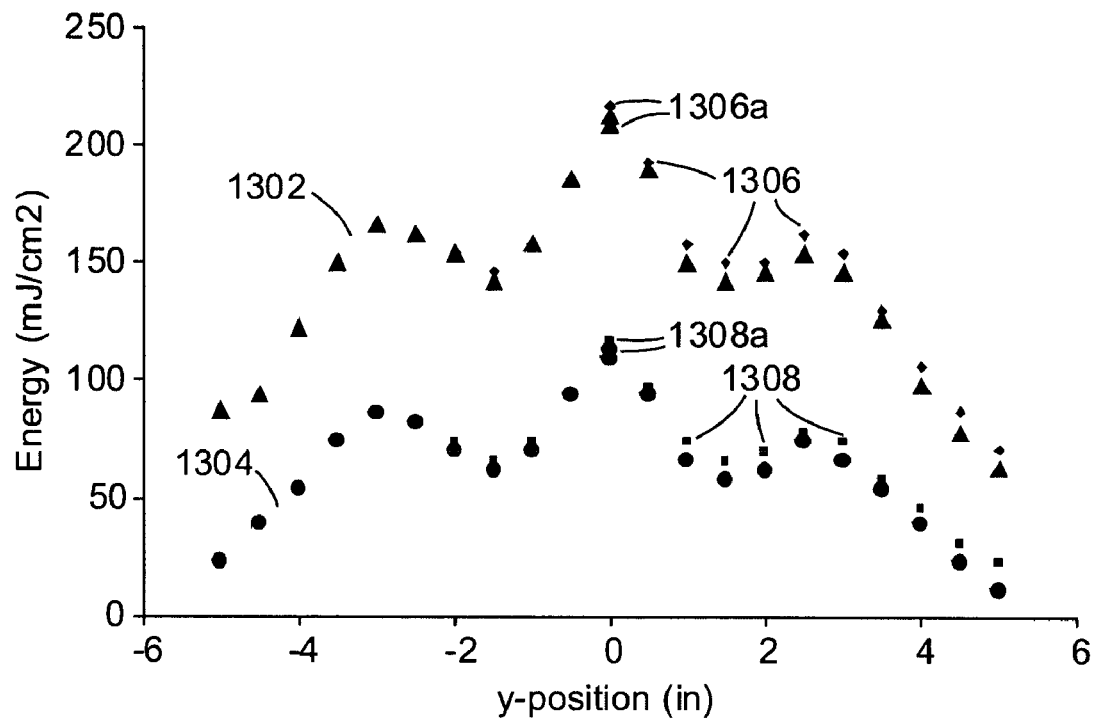
FIGS. 13 and 14 are graphs illustrating measured illumination profiles produced by a UV exposure system as illustrated in FIGS. 12A and 12B.

The measured UV irradiance is shown as a function of y-position, along the direction parallel to the longitudinal axis of the lamp, in FIG. 13. The lamp was set at a height of 31.6 cm from the measurement plane. The set of points shown as triangles 1302, shows the irradiance, in mj cm$^{-2}$, for UVA light, in the wavelength range of 320 nm-390 nm, and the set of points shown as circles 1304 shows the irradiance for UVB light, having a wavelength range of 280 nm-320 nm. The different wavelength ranges were determined by the filters provided with the UV radiometer. As can be seen, the light was measured to have a peak at the center of the illuminated area.

EXAMPLE 6

Figure 14:
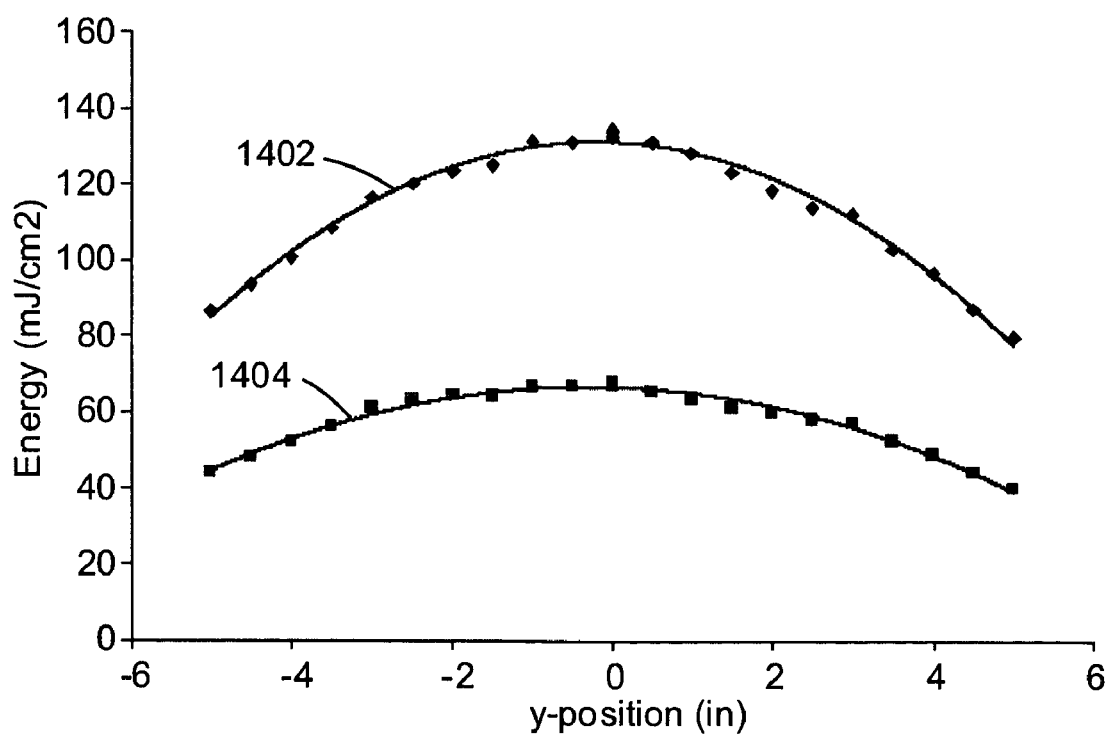

The measurements of Example 5 were repeated, but with the lamp set at a height of 48.3 cm from the measurement plane. The results from these measurements are presented in FIG. 14, which shows curves for UVA light, curve 1402, and UVB light, curve 1404. As can be seen, the total irradiance is reduced, but the illumination profile along the y-direction is smoother than in FIG. 13.

EXAMPLE 7

Figure 15:
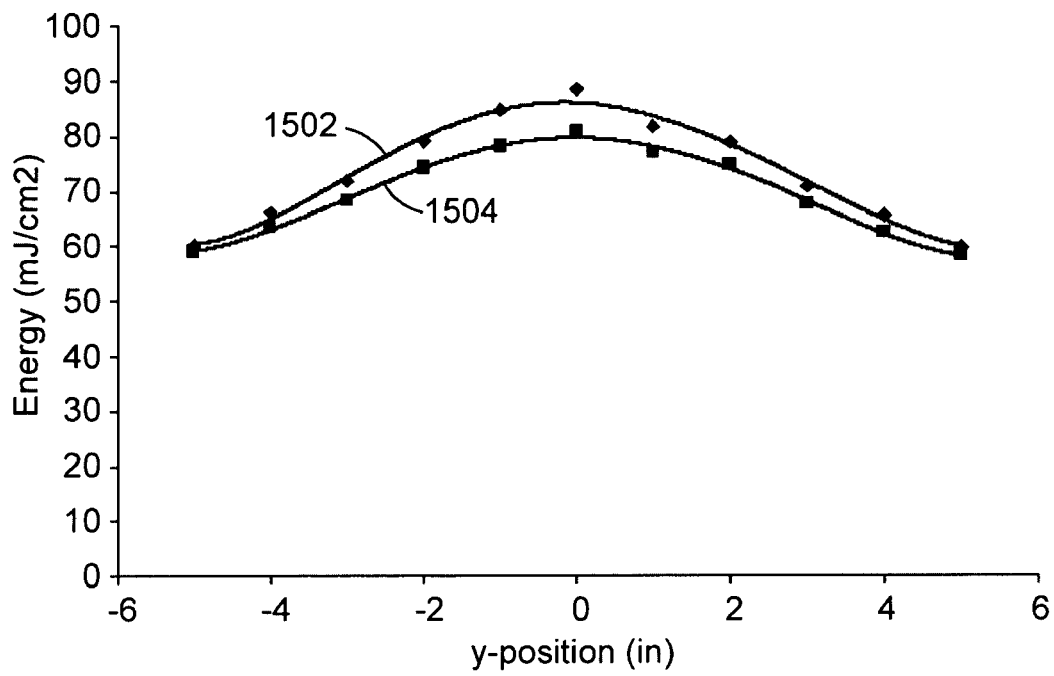
FIG. 15 is a graph illustrating measured illumination profiles produced by a UV exposure system as illustrated in FIGS. 1A and 1B.

For comparison, similar measurements were performed using the unmodified Elsicon OptoAlign™ system, where the divergence of the light from the lamp is defined simply by two aperture plates, in a manner like that shown in FIGS. 1A and 1B, with the lamp set at 31.6 cm from the measurement plane. The reflective assembly was not used. The results are presented in FIG. 15, which shows curves for the UVA light, curve 1502, and the UVB light, curve 1504. The illumination profile along the y-direction is relatively smooth, but the total irradiance is less than is shown in either FIG. 13 or 14. This suggests that the reflective assembly is more effective at directing light to the substrate than the simple aperture plates.

EXAMPLE 8

Another experiment was performed to test the reflectivity of the stainless steel base of the reflective assembly 1210. The Miro-Silver® on the upper surface of the reflective assembly 1210 was removed, so that the reflective surface 1212 was a polished stainless steel surface. The UV irradiance measurements were repeated over most of the y-positions. The results are presented in FIG. 13 as a series of points representing UVA light, 1306, and UVB light 1308. As can be seen, there was little difference between the irradiance measured with the Miro-Silver® reflector and the stainless steel reflector.

In an attempt to determine the accuracy of the irradiance measurements, the irradiance at the central position, 0 cm, was measured a number of times, for both UVA light and UVB light. The points 1306a and 1308a show the spread in the results measured with the steel reflective surface 1212. It was concluded that the error on a measurement-to-measurement basis was relatively small, less than 5%.

Figure 16B:
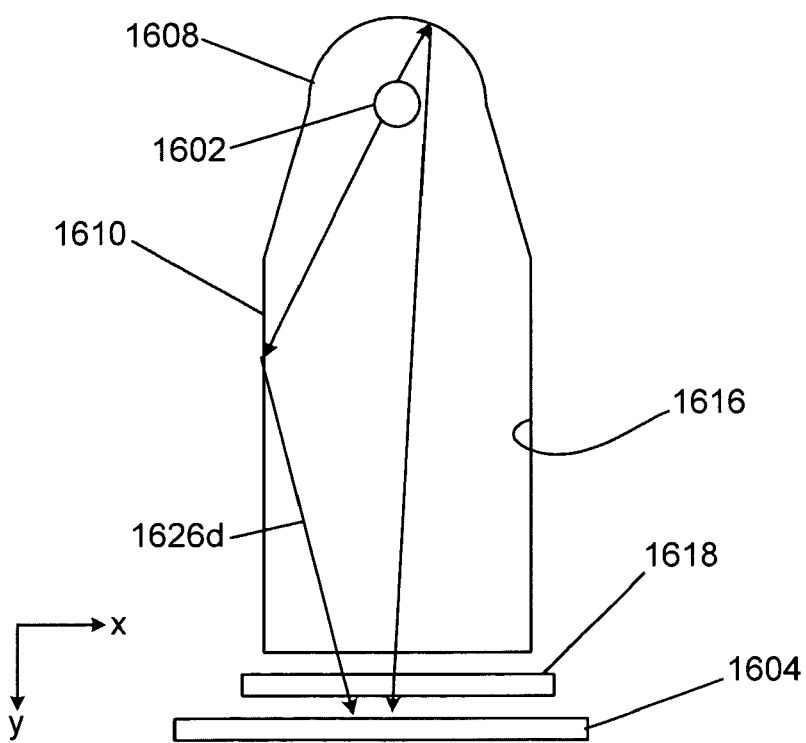
FIGS. 16A and 16B schematically illustrate another embodiment of a UV exposure system that includes a reflective light concentrator, according to principles of the present invention.
Figure 16A:
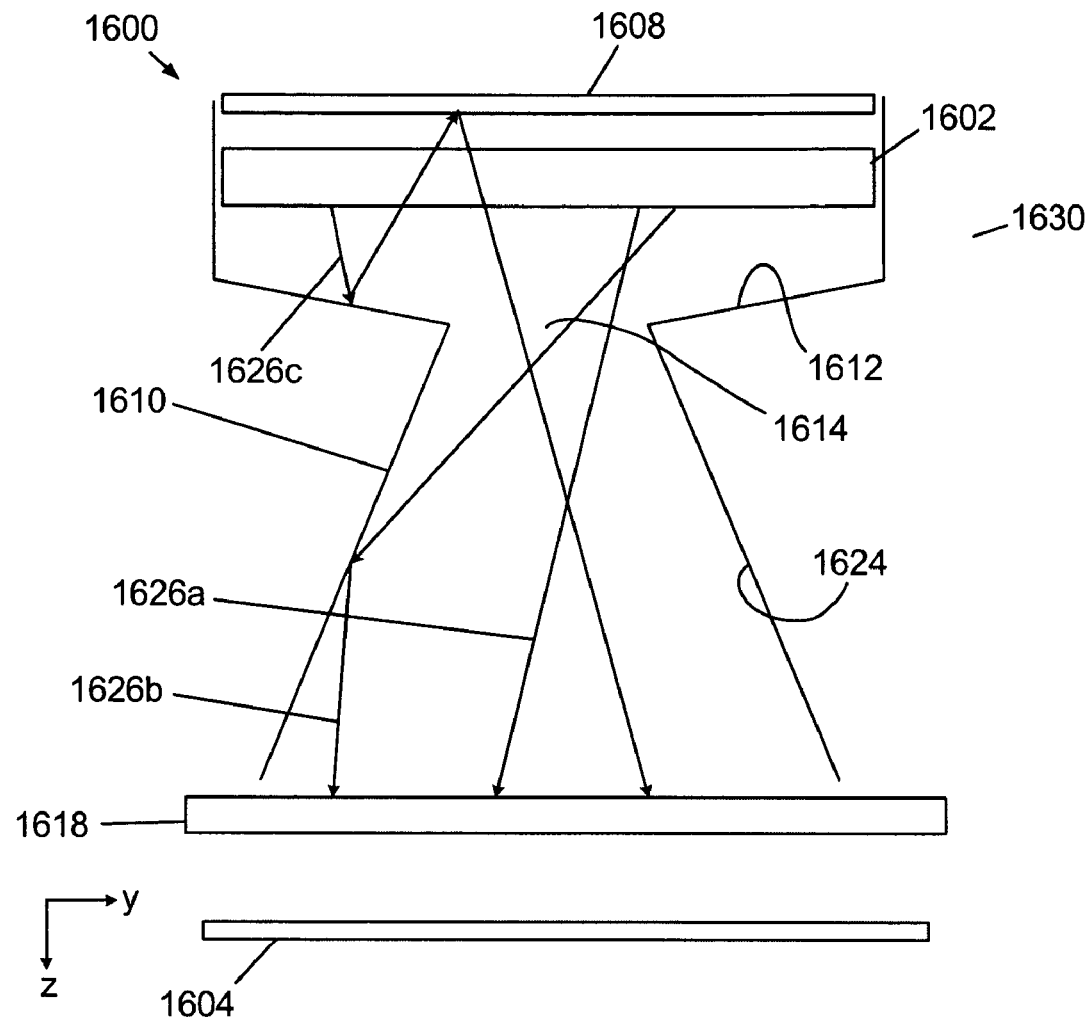

Another embodiment of a UV exposure system 1600 that uses a different type of reflective assembly 1610 is schematically illustrated in FIGS. 16A and 16B. In this embodiment, there is one aperture 1614 that has angled reflective walls 1624 that open towards the substrate 1604. At least a portion of the upper surfaces 1612 of the reflective assembly are angled, so as to be non-parallel to the y-axis.

The lamp 1602 is disposed with its longitudinal axis parallel to the y-axis. Some of the light 1626a emitted by the lamp 1602 is incident on the substrate 1604 directly from the lamp 1602. Another portion of the light 1626b is incident on the substrate 1604 from the lamp 1602 via one or more reflections from the reflective walls 1624. In addition, some of the light emitted from the lamp 1602 may be reflected by the reflector 1608 towards the substrate. For example, light 1626c that is incident on the reflective surface 1612 may be reflected to the upper reflector 1608 and then directed to the substrate 1604. The light is polarized by a polarizer 1618 before incidence on the substrate 1604. A cross-section through the reflector in the x-z plane is schematically presented in FIG. 16B, showing reflection of the light 1626d by reflective walls 1616.

Figure 17:
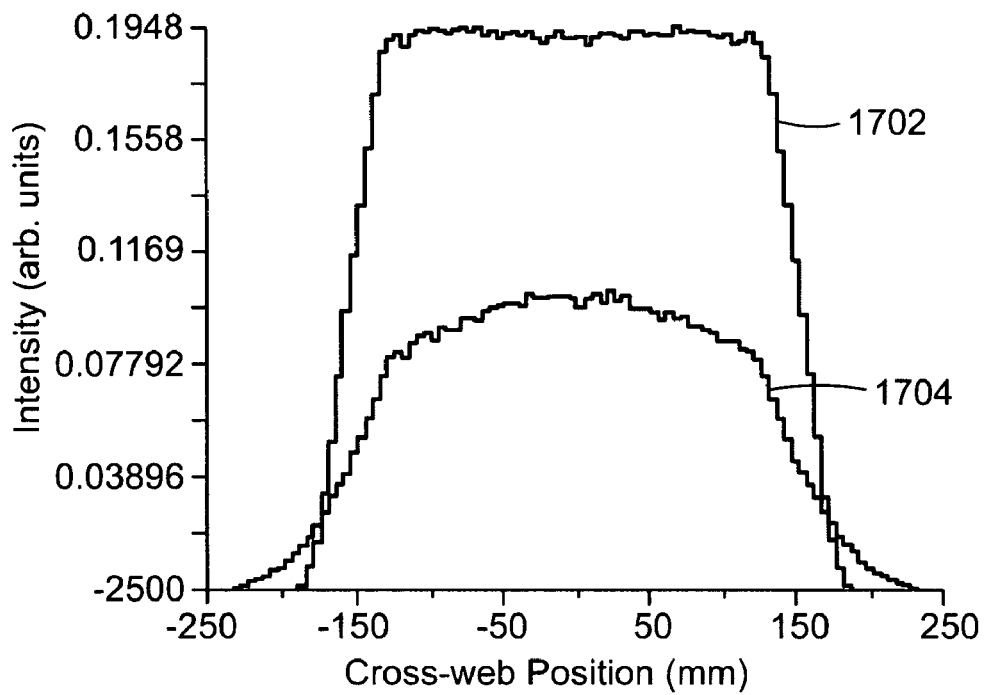
FIG. 17 is a graph showing a calculated comparison of the illumination profile of the exposure system illustrated in FIGS. 16A and 16B with the illumination profile of the exposure system illustrated in FIGS. 1A and 1B.

The illumination of the substrate using the reflective assembly 1610 was numerically modeled to compare the performance of the reflective assembly with the two-slit arrangement as shown in FIG. 1A. The results of the numerical modeling are now discussed with reference to FIGS. 17-19. Curve 1702 in FIG. 17 shows the intensity on the substrate calculated for different positions across the substrate when the reflective assembly 1610 is used to direct the light to the substrate. Curve 1704 shows the intensity on the substrate calculated when the two-slit arrangement is used to direct light to the substrate. The intensity profile is flatter across more of the substrate when the reflective assembly is used. In addition, the intensity of the light incident on the substrate is significantly higher when the reflective assembly is used, almost double the intensity achieved using the two slit arrangement.

Figure 18:
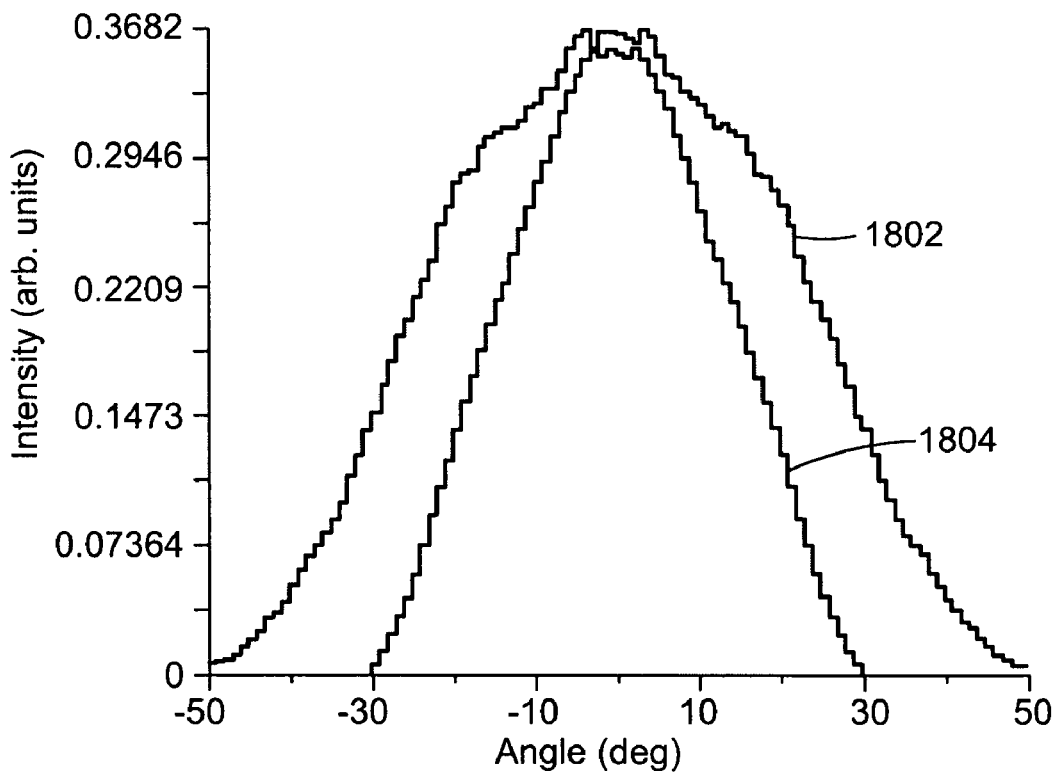
FIG. 18 is a graph showing the calculated angular dependence of the exposure light generated by the system illustrated in FIGS. 16A and 16B.

Curves 1802 and 1804, in FIG. 18, respectively show the angular dependence of the light in the down-web direction (in the x-z plane), and in the cross-web direction (in the y-z plane). The full-angle, half maximum divergence of the light in the down-web direction is about 54° and about 34° in the cross-web direction. The divergence of the light incident on the substrate is dependent on the angles of the reflecting walls 1616 and 1624 of the reflective assembly. In the case that was numerically modeled, the walls 1624 were at an angle of 15° from being parallel to the z-axis. The walls 1616 were assumed to be parallel to the z-axis.

Figure 19:
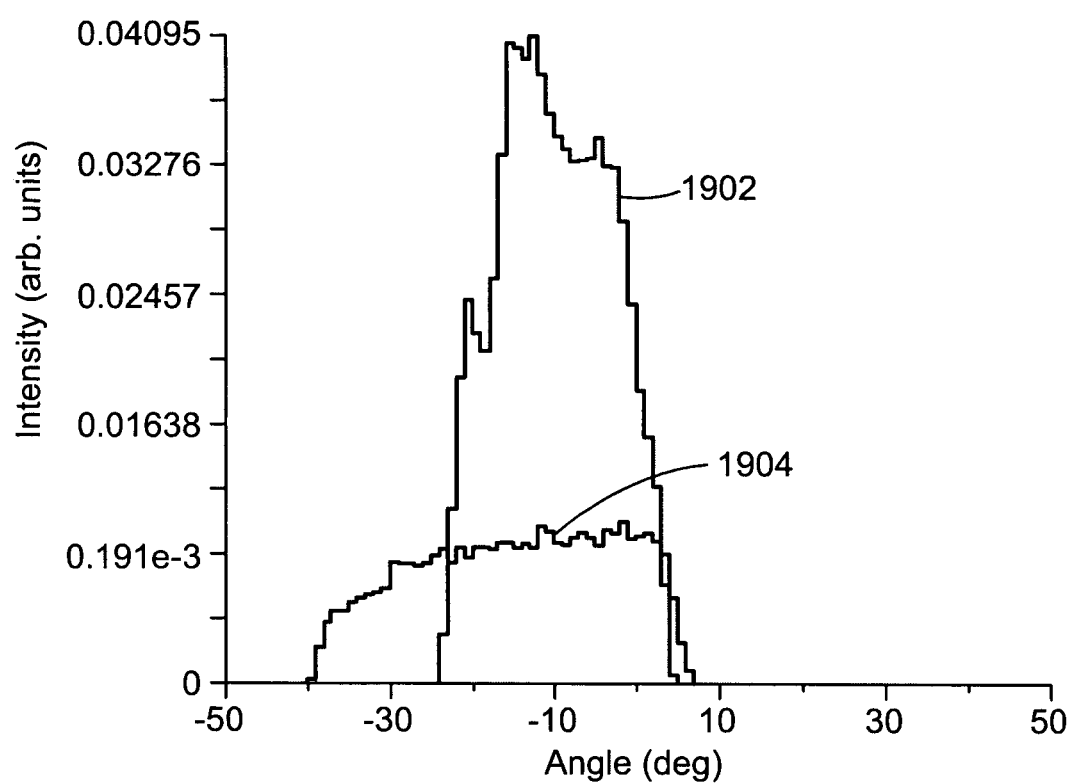
FIG. 19 is a graph showing the calculated cross-web angular dependence of the exposure light generated by the system illustrated in FIGS. 16A and 16B compared with that of the system illustrated in FIGS. 1A and 1B.

FIG. 19 shows the calculated angular distribution of light arriving at one point on the substrate. The cross-web angular dependence of the light incident on the substrate using the reflective assembly is shown as curve 1902 and using the two-slit approach is shown as curve 1904. In each case, the light distribution was calculated for a position laterally disposed 100 mm from the center of the substrate. The full angle, half maximum divergence for the system using the reflective assembly is approximately 22°, and is approximately 40° when using the two-slit approach. Neither distribution, curve 1902 or 1904, is centered at zero, which shows that the net incident direction of light is oblique for a position off-center of the substrate. However, the light is incident on the substrate over a smaller angular range when the reflective assembly is used (curve 1902). Thus, the azimuthal rotation of the polarization is reduced when using the reflective assembly.

The curves 1802 and 1804 shown in FIG. 18 are each the result of adding together many curves of the type shown in FIG. 19, each from a different point across the web.

Another embodiment of the invention is now described with reference to FIG. 20A, which schematically illustrates a side view of an exposure system 2000 (system A), in which the curved reflector 2008 is parabolic and the lamp 2002 is positioned at, or close to the focus of the parabolic reflector 2008. Accordingly, light 2006 is substantially collimated after being reflected by the reflector 2008. A pair of apertures 2012 and 2016 may be used to define the down-web extent of the light incident on the target substrate 2004. A reflective structure (not shown) may be used to reduce cross-web light divergence.

Other types of exposure systems, for example, as illustrated in FIGS. 1A and 1B, use an elliptically curved reflector and a first slit positioned close to, or at, the focal point of the elliptical reflector and a second slit following the first slit to restrict the downweb angular spread of the light. The angular extent of the light incident on the target substrate in such systems is determined only by the size of the slits, and a reduction in the slit aperture size, to reduce down-web angular spread, results in a reduction in the amount of light incident on the target substrate.

Figure 21A:
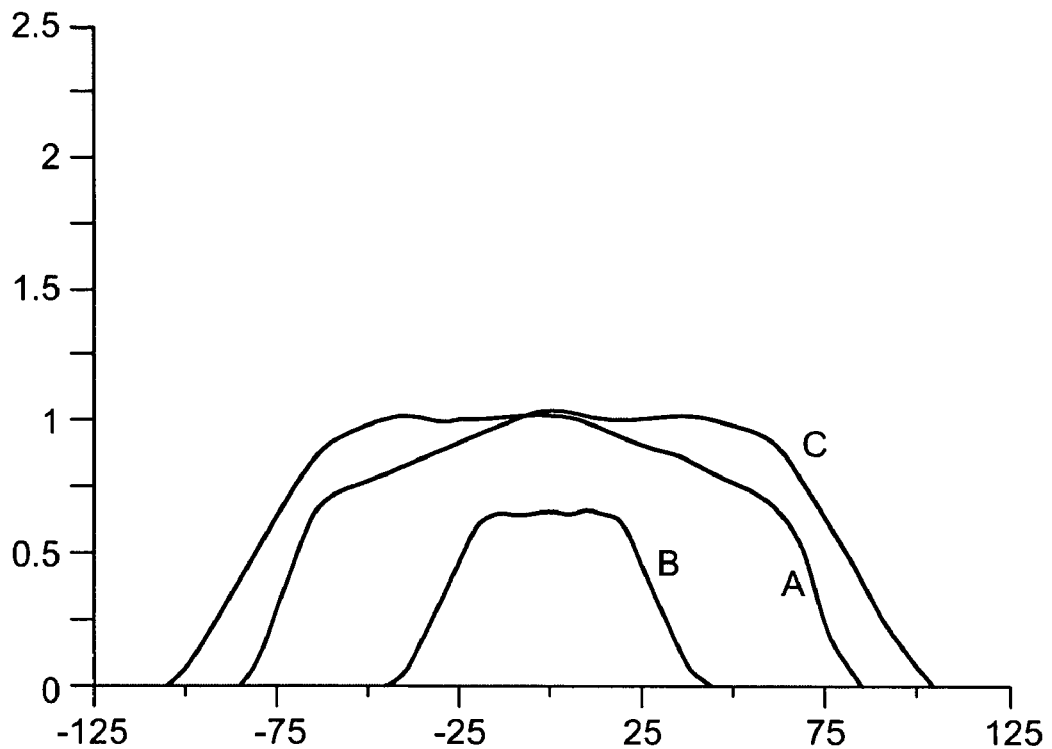
FIG. 21A presents a graph illustrating down-web illumination profile for the exposure systems illustrated in FIGS. 20A-20C as a function of position.
Figure 21B:
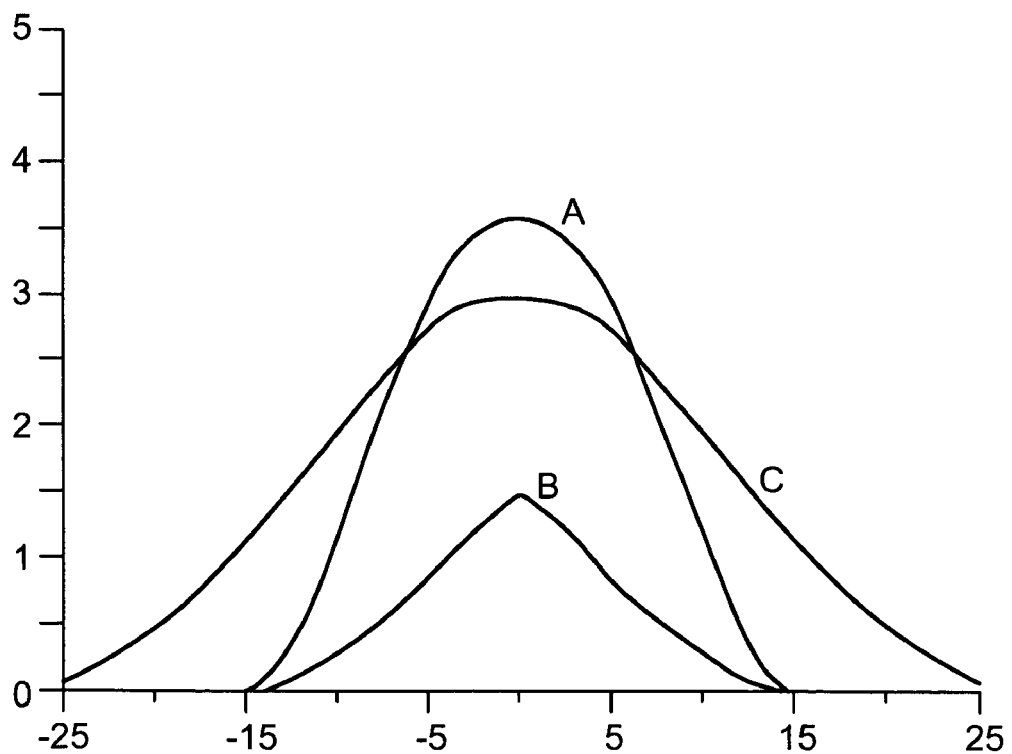
FIG. 21B presents a graph illustrating down-web illumination profile for the exposure systems illustrated in FIGS. 20A-20C as a function of incident angle.

FIGS. 21A and 21B compare the calculated profile of light incident at the target substrate for the exposure system of FIG. 20A (system A) with those of the sample illumination systems 2050 and 2070 illustrated in FIGS. 20B and 20C respectively. System 2050 (system B) is similar to that illustrated in FIGS. 1A and 1B, using an elliptical reflector 2058 and a pair of slits 2012 and 2016 to define the extent of the light 2056 incident on the target substrate 2004. The slit aperture was 38 mm. System 2170 (system C) assumes an elliptical reflector 2078, but uses a reflective assembly 2072 to direct the light 2076 to the target substrate 2004. The reflective assembly 2072 has walls 2078 formed at an angle of 15° to the axis 2082. The lamp in each case was assumed to be the same, as was the separation between the lamp and the target substrate. These calculations omitted any effect from polarizers. The efficiency of transferring light from the lamp to the target substrate for each of the systems is summarized in Table IV

TABLE IV

| Illumination Systems | | |
|---|---|---|
| System | Description | Illumination Efficiency |
| A | Parabolic/slits (120 mm) | 33.4% |
| B | Elliptical/slits (38 mm) | 10.4% |
| C | Elliptical/horn | 43.9% |

As can be seen from the table, the system B shows the lowest efficiency.

FIG. 21A shows the down-web intensity of the light in arbitrary units as a function of position along the web, labeled for each of the systems A-C. The width of the illuminated area is greater for systems A and C, approximately 150 mm, full width half maximum.

FIG. 21B shows the down-web intensity of light incident at the target substrate as a function of incident angle in degrees. System A provides greatest intensity at angles close to zero incidence (normal incidence), and has a narrower angular spread, about 18° full angle half maximum (FAHM), than system C, about 26° FAHM.

Figure 22A:
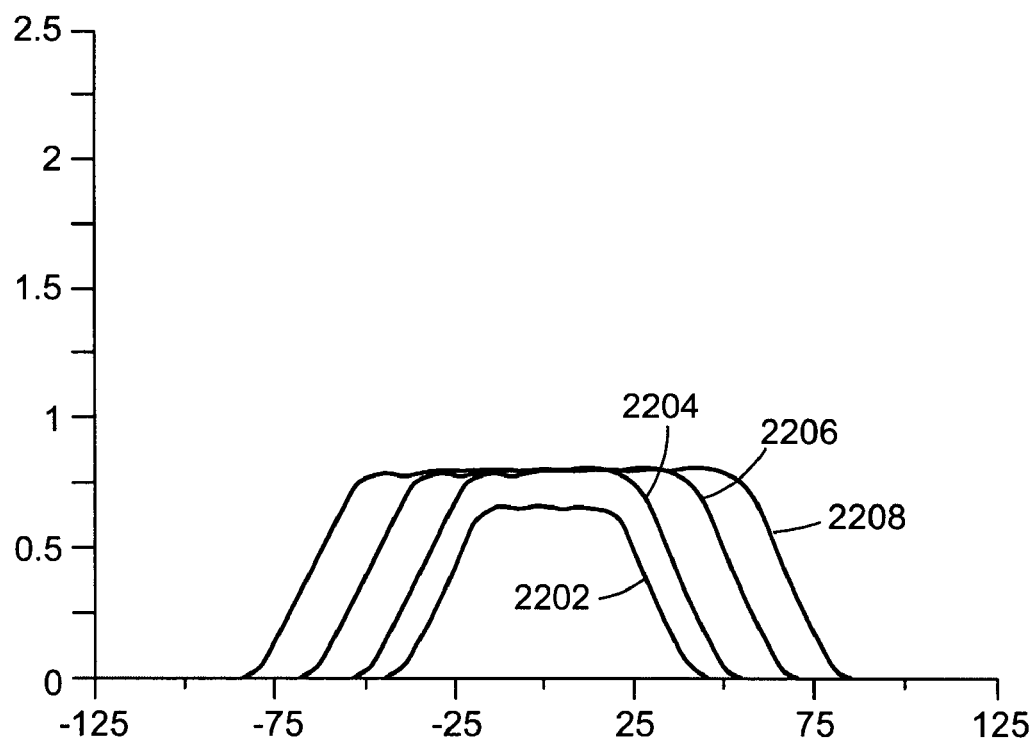
FIG. 22A presents a graph illustrating down-web illumination profiles for the exposure system of FIG. 20B as a function of position, for different slit aperture sizes.
Figure 22B:
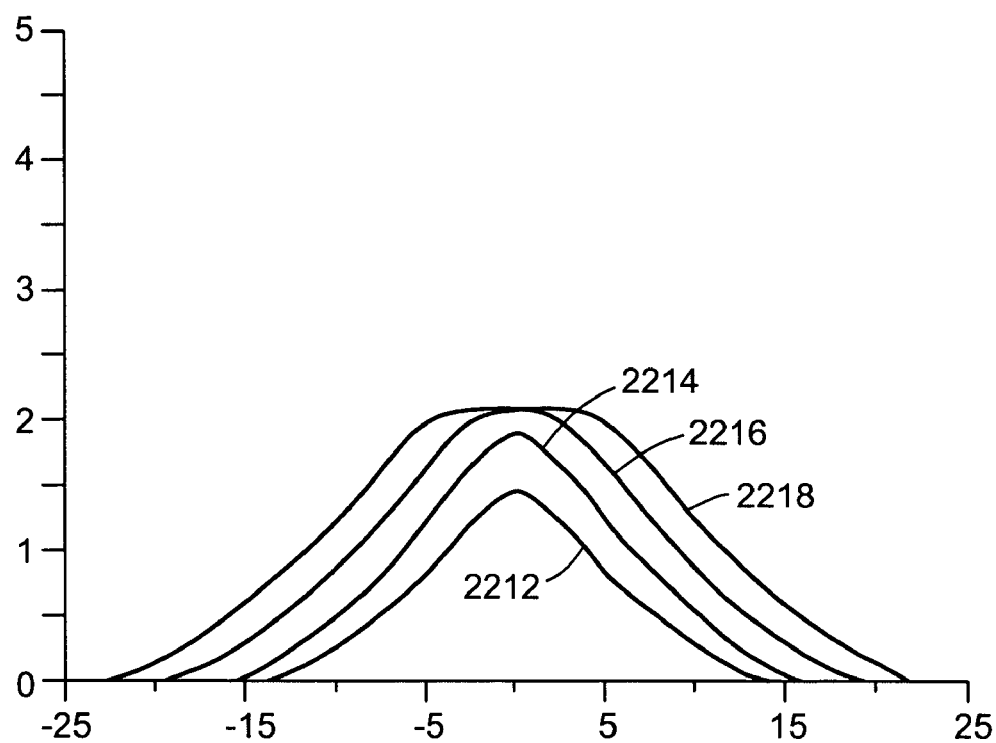
FIG. 22B present a graph illustrating down-web illumination profiles for the exposure system of FIG. 20B as a function of incident angle, for different slit aperture sizes.

The angular extent of the light using system B was about 10° (FAHM). Calculations were performed to analyze the increase in intensity and angular spread of light in system A for slits of different widths. The results in FIG. 22A for the incident light intensity as a function of down-web position (mm) and in FIG. 22B as a function of down-web angular spread (degrees). The results presented in FIGS. 22A and 22B are summarized in Table V. The table also lists the illumination efficiency. As expected, the illumination efficiency increases as the slit aperture increases.

TABLE V

| Operation of Illumination System B with Various Slit Apertures | | | | | |
|---|---|---|---|---|---|
| Slit width (mm) | Illumination efficiency (%) | Width, mm (FWHM) | FIG. 22A Curve # | Angle spread (FAHM) | FIG. 22B Curve # |
| 38 | 10.4 | 56 | 2202 | 10° | 2212 |
| 50 | 15.5 | 70 | 2204 | 14° | 2214 |
| 70 | 21.7 | 100 | 2206 | 18° | 2216 |
| 90 | 27.9 | 130 | 2208 | 22° | 2218 |

With an aperture of 70 mm, system B has a FAHM of 180, but an illumination efficiency of only 21.7%. This contrasts with system A which also has an FAHM of 18°, but has an illumination efficiency of 33.4%. Thus, for the same angular spread, system A puts 50% more light on the target substrate than system B. Even when the aperture is opened up to 90°, the illumination efficiency of system B is less than for system A, but the angular spread is greater.

It will be appreciated that the calculations discussed relative to FIGS. 21 and 22 are appropriate to a particular geometry and that other results may be achieved for different geometries. However, these calculations do indicate, at least qualitatively, that under certain conditions, an arrangement of a parabolic reflector and slits (system A) does provide relatively high values of incident light intensity with relatively small angular spread.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical exposure system for exposing an optical alignment layer at a target area, the system comprising:
 a light source elongated in a direction parallel to a first axis;
 a first polarizer disposed to polarize at least a portion of the light passing from the light source to the target area; and
 a polarization rotation compensation element disposed beside the first polarizer so that at least some of the light from the light source that reaches the target, and that is not incident on the first polarizer, is incident on the polarization rotation compensation element, so that light incident at the target area via the first polarizer has a first azimuthal polarization rotation profile across the target area and light incident at the target area via the polarization compensation element has a second azimuthal polarization rotation profile that substantially compensates for the first azimuthal polarization rotation profile.

2. A system as recited in claim 1, wherein the polarization rotation compensation element is a second polarizer.

3. A system as recited in claim 1, wherein the first polarizer is tilted relative to a system axis in a first direction and the polarization rotation compensation element has a surface tilted relative to the system axis in a second direction opposite to the first direction.

4. A system as recited in claim 1, wherein the light source comprises a UV lamp.

5. A system as recited in claim 1, further comprising at least one pair of aperture plates disposed between the light source and the target area to define a first aperture elongated in a direction substantially parallel to the first axis.

6. A system as recited in claim 1, wherein the light passing from the first polarizer to the target area is transmitted through the first polarizer.

7. A system as recited in claim 1, wherein light passing from the first polarizer to the target area is reflected by the first polarizer.

* * * * *

UNITED STATES PATENT AND TRADEMARK OFFICE
CERTIFICATE OF CORRECTION

PATENT NO. : 7,413,317 B2  Page 1 of 1
APPLICATION NO. : 10/858998
DATED : August 19, 2008
INVENTOR(S) : Jeffrey L. Solomon It is certified that error appears in the above-identified patent and that said Letters Patent is hereby corrected as shown below:

<u>First Page, Column 2 (Abstract)</u>
Line 2, delete "anistropically" and insert -- anisotropically --, therefor.

<u>Column 12</u>
Line 54, delete "01," and insert -- θ1, --, therefor.

<u>Column 13</u>
Line 1, delete "+0.5°" and insert -- ±0.5° --, therefor.

<u>Column 14</u>
Line 31, delete "illustrated)." and insert -- illustrated) --, therefor.

<u>Column 15</u>
Line 37, delete "mj" and insert -- mJ --, therefor.

<u>Column 15</u>
Line 37, delete "cm$^{-2}$" and insert -- cm$^2$ --, therefor.

<u>Column 17</u>
Line 67, after "Table IV" insert -- . --.

<u>Column 18</u>
Line 46, delete "180," and insert -- 18°, --, therefor.

Signed and Sealed this

Twenty-fourth Day of March, 2009

JOHN DOLL
*Acting Director of the United States Patent and Trademark Office*